(12) United States Patent
Kamuro et al.

(10) Patent No.: US 6,330,692 B1
(45) Date of Patent: Dec. 11, 2001

(54) METHOD OF DETERMINING THE ROUTE TO BE TESTED IN A LOAD MODULE TEST

(75) Inventors: Shingo Kamuro; Ikunori Moriya; Ikuko Kubota; Yoriko Yoshitomi; Tetsuro Imamura; Hirotoshi Yamada; Hideki Tosaka, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/115,368

(22) Filed: Jul. 14, 1998

(30) Foreign Application Priority Data

Feb. 18, 1998 (JP) .................................................. 10-035879

(51) Int. Cl.[7] ................................................. G06F 15/173
(52) U.S. Cl. ................................ 714/38; 712/236; 717/1; 717/4; 717/9; 717/10; 714/45; 714/48; 714/51
(58) Field of Search ............................. 712/32, 233, 234, 712/236, 335, 241; 710/38, 40; 717/1, 9, 4, 10; 714/45, 48, 51, 38

(56) References Cited

U.S. PATENT DOCUMENTS

| | | | |
|---|---|---|---|
| 3,623,012 | * | 11/1971 | Lowry et al. ........................... 705/30 |
| 4,499,596 | * | 2/1985 | Casey et al. ........................... 382/159 |
| 5,067,129 | * | 11/1991 | Evans et al. ........................... 714/32 |
| 5,165,025 | * | 11/1992 | Lass ....................................... 714/38 |
| 5,168,563 | * | 12/1992 | Shenoy et al. ......................... 712/28 |
| 5,297,150 | * | 3/1994 | Clark ...................................... 714/26 |
| 5,317,743 | * | 5/1994 | Imai et al. ............................. 395/706 |
| 5,394,347 | * | 2/1995 | Kita et al. ............................. 364/578 |
| 5,517,629 | * | 5/1996 | Boland .................................. 714/38 |
| 5,551,047 | * | 8/1996 | Mori et al. ............................. 712/28 |
| 5,652,899 | * | 7/1997 | Mays et al. ........................... 707/512 |
| 5,729,676 | * | 3/1998 | Inoue ..................................... 714/38 |
| 5,805,894 | * | 9/1998 | Robison ................................ 395/709 |
| 5,933,622 | * | 8/1999 | Buzbee et al. ....................... 395/500 |

FOREIGN PATENT DOCUMENTS

| | | |
|---|---|---|
| 4237342 | 8/1992 | (JP) . |
| 4260941 | 9/1992 | (JP) . |
| 7219819 | 8/1995 | (JP) . |

OTHER PUBLICATIONS

Beizer, "Software Testing Techniques", 2nd edition, Copyright 1990, pp. 59–121, 160–171, 374–387.*
Fairley, "Software Engineering Concepts", 1985, pp. 275–293.*

* cited by examiner

Primary Examiner—Thomas Lee
Assistant Examiner—Dzung C. Nguyen
(74) Attorney, Agent, or Firm—Rosenman & Colin LLP

(57) ABSTRACT

A method of determining a route to be tested in the testing of a load module which includes a multiplicity of routes (route patterns) from the start to the end of the program, each route pattern being composed of a multiplicity of route paths. The method comprises the steps of: (1) testing an untested route pattern and managing the current state of the testing of all the route patterns with the untested route pattern changed to a tested route pattern; (2) managing the current state of the testing of all the route paths with the route paths constituting the untested route pattern changed to tested route paths; and (3) determining an untested route pattern which is constituted by the largest number of untested route paths to be the route pattern to be tested next. These steps are repeated until there exists no untested route path in the load module test.

6 Claims, 33 Drawing Sheets

| NAME OF ROUTE PATH | EXECUTION FLAG | |
|---|---|---|
| a | OFF | |
| b | OFF | |
| c | OFF | |
| d | OFF | |
| e | OFF | |
| f | OFF | |
| g | OFF | |
| h | OFF | |
| i | OFF | |
| j | OFF | |

RPH

| NAME OF ROUTE PATTERN | EXECUTION FLAG | NUMBER OF UNTESTED ROUTE PATHS ··· |
|---|---|---|
| abdefhj | OFF | 7 |
| abdeghj | OFF | 7 |
| abdij | OFF | 5 |
| acdefhj | OFF | 7 |
| acdeghj | OFF | 7 |
| acdij | OFF | 5 |

RPT

| NAME OF ROUTE PATH | EXECUTION FLAG |
|---|---|
| a | ON |
| b | ON |
| c | OFF |
| d | ON |
| e | ON |
| f | ON |
| g | OFF |
| h | ON |
| i | OFF |
| j | ON |

| NAME OF ROUTE PATTERN | EXECUTION FLAG | NUMBER OF UNTESTED ROUTE PATHS ··· |
|---|---|---|
| abdefhj | ON | 0 |
| abdeghj | OFF | 1 |
| abdij | OFF | 1 |
| acdefhj | OFF | 1 |
| acdeghj | OFF | 2 |
| acdij | OFF | 2 |

FIG.8

| NAME OF ROUTE PATH | . . . . . | NUMBER OF STEPS |
|---|---|---|
| a | . . . . . | 500 |
| b | . . . . . | 600 |
| c | . . . . . | 300 |
| d | . . . . . | 700 |
| e | . . . . . | 1000 |
| f | . . . . . | 800 |
| g | . . . . . | 500 |
| h | . . . . . | 400 |
| i | . . . . . | 300 |
| j | . . . . . | 600 |
| k | . . . . . | 700 |
| l | . . . . . | 200 |
| m | . . . . . | 600 |
| n | . . . . . | 200 |

FIG.9A

ROUTE PATTERN INFORMATION AFTER TESTING "acdeghjln" AND "abdefhjkn"   RPT

| ROUTE PATTERN INFORMATION | | | |
|---|---|---|---|
| NAME OF ROUTE PATTERN | EXECUTION FLAG | NUMBER OF UNTESTED ROUTE PATHS | NUMBER OF STEPS ··· |
| acdeghjln | on | 0 | 4400 |
| abdefhjkn | on | 0 | 5500 |
| abdijkn | off | 1 | 3600 |
| acdijln | off | 1 | 2800 |
| abdijmn | off | 2 | 3500 |
| acdijmn | off | 2 | 3200 |
| ⋮ | ⋮ | ⋮ | |

FIG.9B

   RPT

| ROUTE PATTERN INFORMATION | | | |
|---|---|---|---|
| NAME OF ROUTE PATTERN | EXECUTION FLAG | NUMBER OF UNTESTED ROUTE PATHS | NUMBER OF STEPS ··· |
| abdijmn | off | 2 | 3500 |
| acdijmn | off | 2 | 3200 |
| abdijkn | off | 1 | 3600 |
| acdijln | off | 1 | 2800 |
| acdeghjln | on | 0 | 4400 |
| abdefhjkn | on | 0 | 5500 |
| ⋮ | ⋮ | ⋮ | |

FIG.9C

   RPT

| ROUTE PATTERN INFORMATION | | | |
|---|---|---|---|
| NAME OF ROUTE PATTERN | EXECUTION FLAG | NUMBER OF UNTESTED ROUTE PATHS | NUMBER OF STEPS ··· |
| acdijmn | off | 2 | (3200STEPS) |
| abdijmn | off | 2 | (3500STEPS) |
| acdijln | off | 1 | (2800STEPS) |
| abdijkn | off | 1 | (3600STEPS) |
| acdeghjln | on | 0 | 4400STEPS |
| abdefhjkn | on | 0 | 5500STEPS |
| ⋮ | ⋮ | ⋮ | |

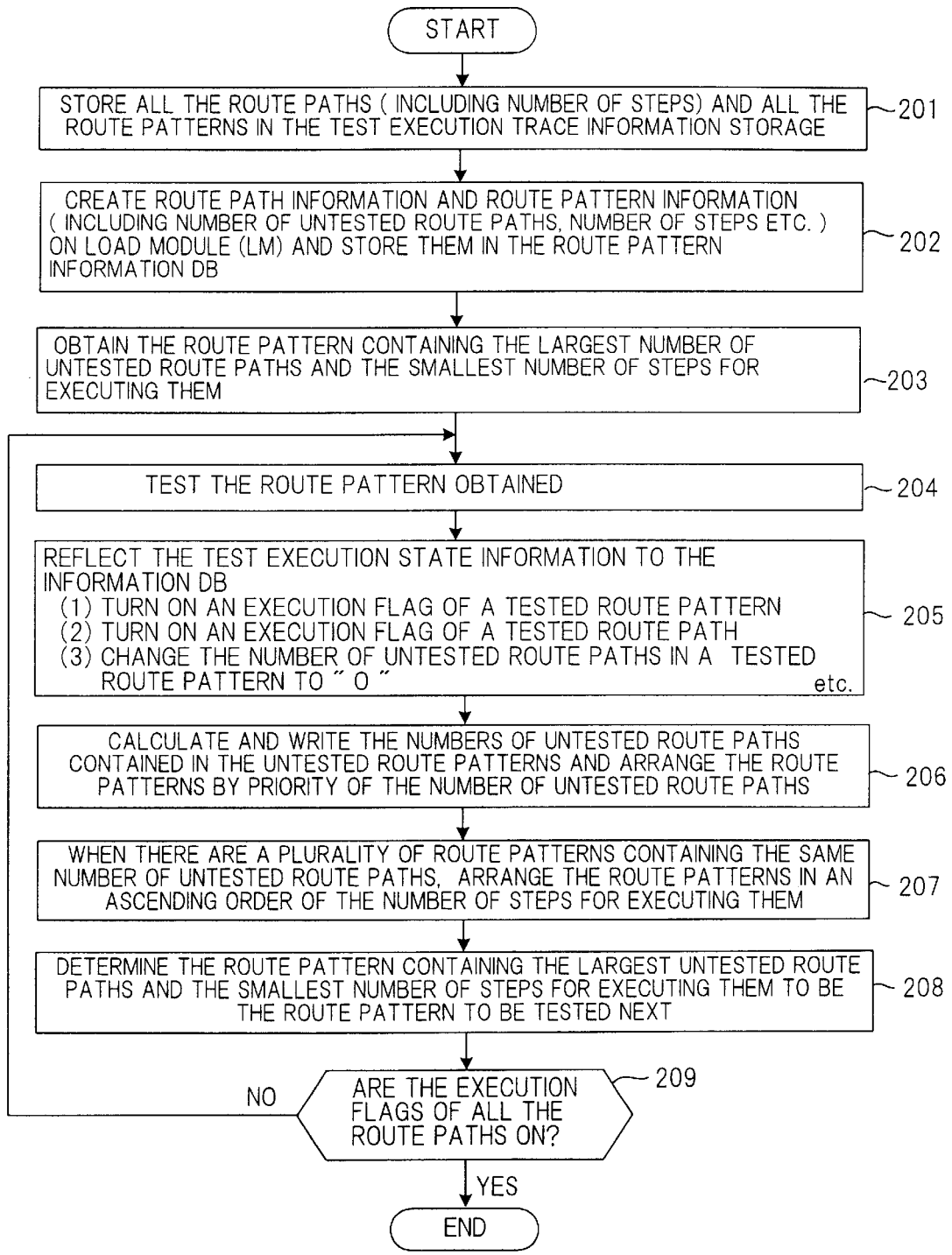

FIG.14

RPH:

NAME OF MODULE: A
NAME OF FUNCTION: func-A
ROUTE PATH INFORMATION

| NAME OF ROUTE PATH | FUNCTION CALL FLAG | EXECUTION FLAG |
|---|---|---|
| A-a | off | off |
| A-b | on | – |
| A-c | on | – |
| A-d | off | off |
| A-e | off | off |
| A-f | on | – |
| A-g | off | off |

RPT:

ROUTE PATTERN INFORMATION

| NAME OF ROUTE PATTERN | NUMBER OF UNTESTED ROUTE PATHS IN A CALLING FUNCTION | NAME OF FUNCTION BEING CALLED | EXECUTION FLAG | NUMBER OF UNTESTED ROUTE PATHS IN A FUNCTION BEING CALLED | TOTAL NUMBER OF UNTESTED ROUTE PATHS |
|---|---|---|---|---|---|
| A-a,A-b,A-d,A-e,A-g | 4 | | | 6 | 10 |
| | | funcB-a | off | | |
| | | funcB-c | off | | |
| | | funcB-d | off | | |
| | | funcB-a | off | | |
| | | funcB-b | off | | |
| | | funcB-d | off | | |
| A-a,A-b,A-d,A-f,A-g | 3 | | | 10 | 13 |
| | | funcB-a | off | | |
| | | funcB-c | off | | |
| | | funcB-d | off | | |
| | | funcB-a | off | | |
| | | funcB-b | off | | |
| | | funcB-d | off | | |
| | | funcC-a | off | | |
| | | funcC-b | off | | |
| | | funcC-a | off | | |
| | | funcC-c | off | | |
| A-a,A-c,A-d,A-e,A-g | 4 | | | 4 | 8 |
| | | funcC-a | off | | |
| | | funcC-c | off | | |
| | | funcC-a | off | | |
| | | funcC-b | off | | |
| A-a,A-c,A-d,A-f,A-g | 3 | | | 4 | 7 |
| | | funcC-a | off | | |
| | | funcC-b | off | | |
| | | funcC-a | off | | |
| | | funcC-c | off | | |

FIG.15

1. A-a,A-b,(B-a,B-b,B-d),A-d,A-e,A-g
2. A-a,A-b,(B-a,B-c,B-d),A-d,A-e,A-g
3. A-a,A-b,(B-a,B-b,B-d),A-d,A-f,(C-a,C-b),A-g
4. A-a,A-b,(B-a,B-b,B-d),A-d,A-f,(C-a,C-c),A-g
5. A-a,A-b,(B-a,B-c,B-d),A-d,A-f,(C-a,C-b),A-g
6. A-a,A-b,(B-a,B-c,B-d),A-d,A-f,(C-a,C-c),A-g
7. A-a,A-c,(C-a,C-b),A-d,A-e,A-g
8. A-a,A-c,(C-a,C-c),A-d,A-e,A-g
9. A-a,A-c,(C-a,C-b),A-d,A-f,(C-a,C-b),A-g
10. A-a,A-c,(C-a,C-b),A-d,A-f,(C-a,C-c),A-g
11. A-a,A-c,(C-a,C-c),A-d,A-f,(C-a,C-b),A-g
12. A-a,A-c,(C-a,C-c),A-d,A-f,(C-a,C-c),A-g (THE SYMBOL IN A PARENTHESIS REPRESENTS
A ROUTE PATH IN A FUNCTION BEING CALLED)

FIG.16

1. MODULE A : A-e , A-c
2. MODULE B : B-a , B-b, B-d
3. MODULE C : C-a , C-b

FIG. 17

```
NAME OF MODULE: A
NAME OF FUNCTION: func-A
ROUTE PATH INFORMATION
```

| NAME OF ROUTE PATH | FUNCTION CALL FLAG | EXECUTION FLAG |
|---|---|---|
| A-a | off | on |
| A-b | on | – |
| A-c | on | – |
| A-d | off | on |
| A-e | off | off |
| A-f | on | – |
| A-g | off | on |

(RPH)

| ROUTE PATTERN INFORMATION NAME OF ROUTE PATTERN | NUMBER OF UNTESTED ROUTE PATHS IN A CALLING FUNCTION | NAME OF FUNCTION BEING CALLED | EXECUTION FLAG | NUMBER OF UNTESTED ROUTE PATHS IN A FUNCTION BEING CALLED | TOTAL NUMBER OF UNTESTED ROUTE PATHS |
|---|---|---|---|---|---|
| A-a,A-b,A-d,A-e,A-g | 1 | | | 3 | 4 |
| | | funcB-a | on | | |
| | | funcB-c | on | | |
| | | funcB-d | on | | |
| | | funcB-a | off | | |
| | | funcB-b | off | | |
| | | funcB-d | off | | |
| A-a,A-b,A-d,A-f,A-g | 0 | | | 5 | 5 |
| | | funcB-a | on | | |
| | | funcB-c | on | | |
| | | funcB-d | on | | |
| | | funcB-a | off | | |
| | | funcB-b | off | | |
| | | funcB-d | off | | |
| | | funcC-a | off | | |
| | | funcC-b | off | | |
| | | funcC-a | on | | |
| | | funcC-c | on | | |
| A-a,A-c,A-d,A-e,A-g | 2 | | | 2 | 4 |
| | | funcC-a | on | | |
| | | funcC-c | on | | |
| | | funcC-a | off | | |
| | | funcC-b | off | | |
| A-a,A-c,A-d,A-f,A-g | 1 | | | 2 | 3 |
| | | funcC-a | off | | |
| | | funcC-b | off | | |
| | | funcC-a | on | | |
| | | funcC-c | on | | |

(RPT)

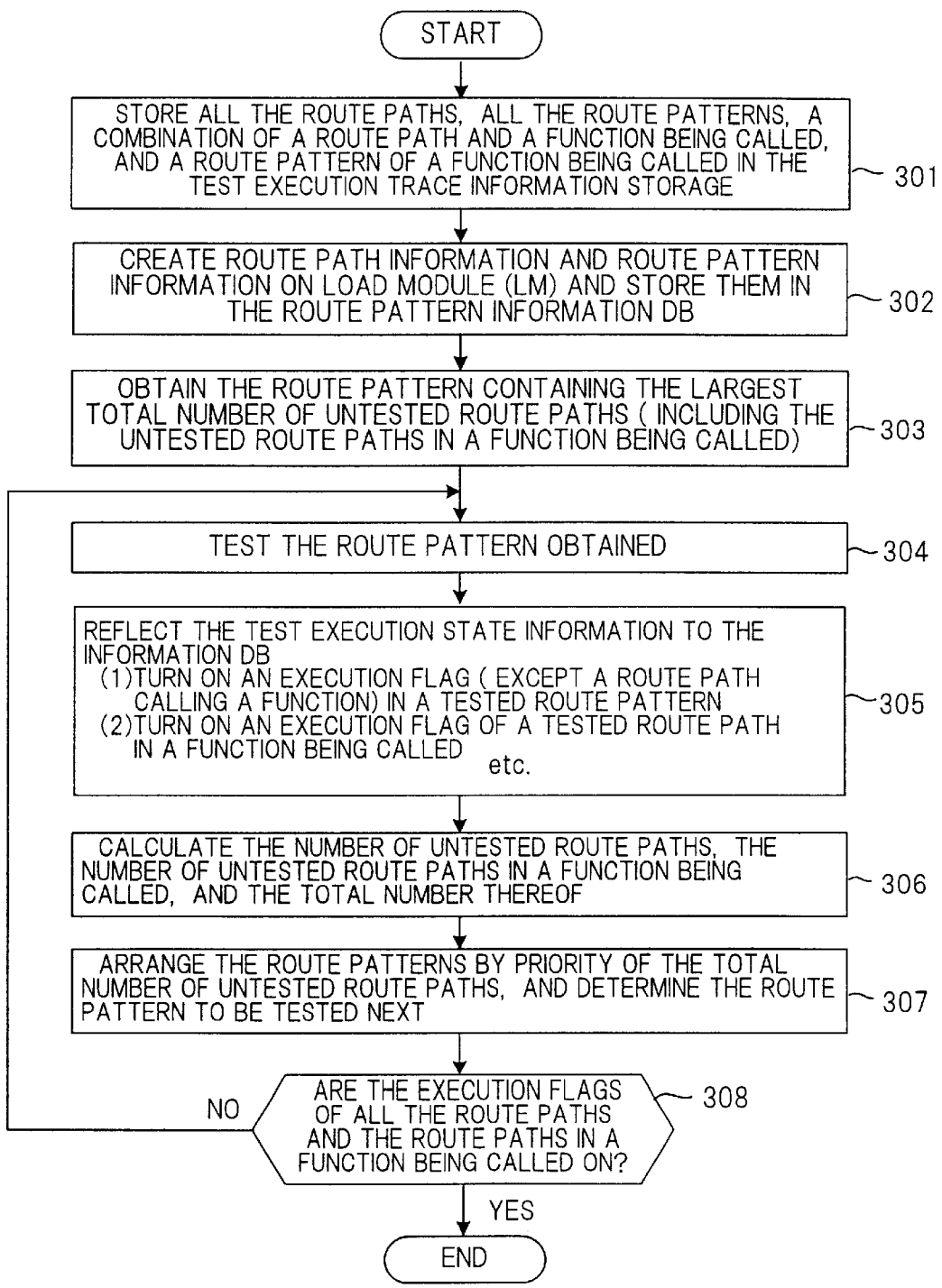

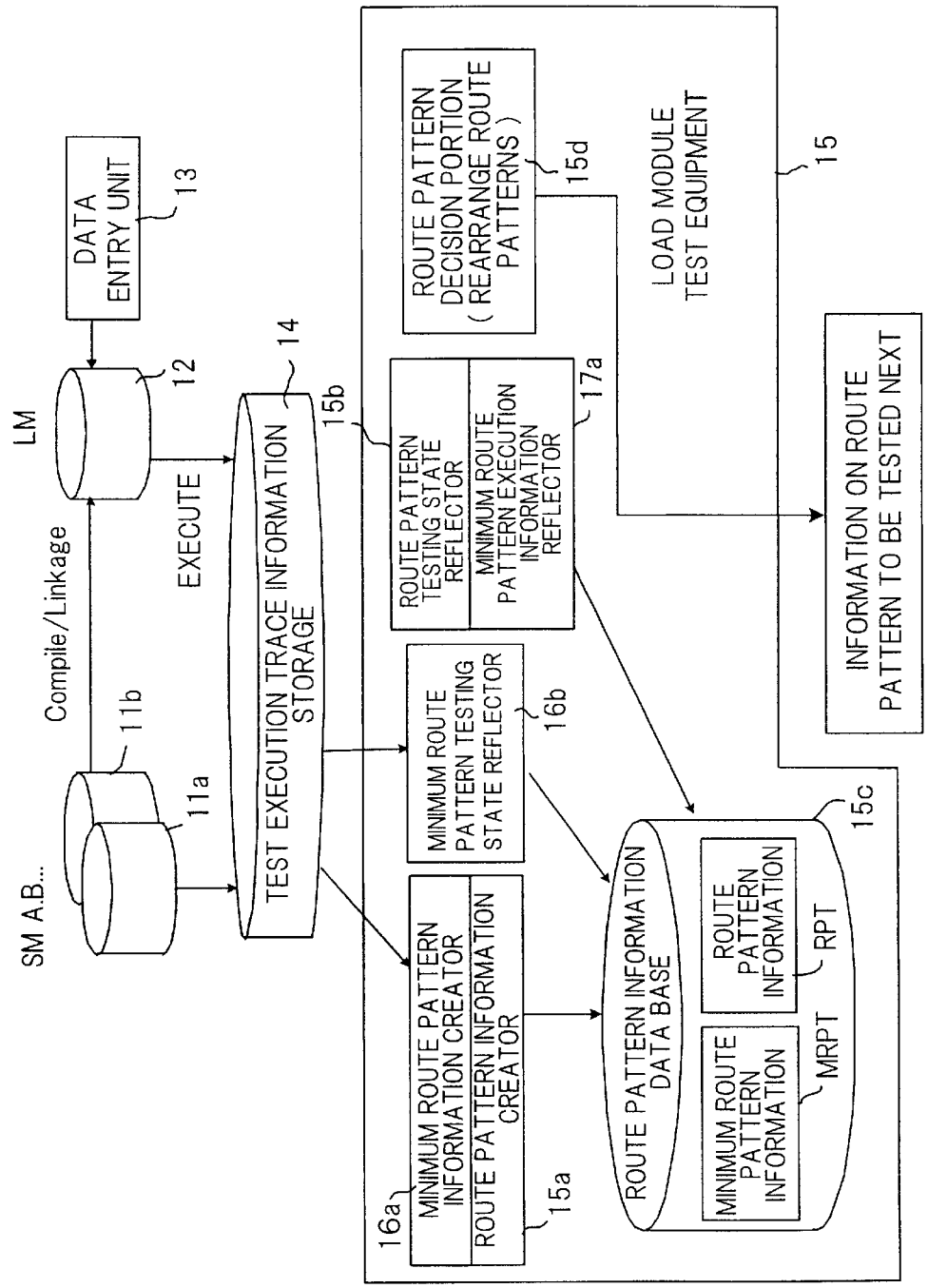

BRANCHED TREE OF SOURCE CODE

BRANCHED TREE CONTAINING
ROUTE BLOCKS

FIG.26A

OLD ROUTE PATTERN INFORMATION — RPT

| NAME OF ROUTE PATTERN | EXECUTION FLAG | NUMBER OF UNTESTED ROUTE PATHS |
|---|---|---|
| a-b-d-e-f-h-j | off | 7 |
| a-c-d-e-g-h-j | off | 7 |
| a-c-d-e-f-h-j | off | 7 |
| a-b-d-e-g-h-j | off | 7 |
| a-b-d-i-j | off | 5 |
| a-c-d-i-j | off | 5 |

FIG.26B

ROUTE BLOCK INFORMATION — RBL

| NAME OF ROUTE BLOCK | ROUTE PATH | ENTRY CONDITION |
|---|---|---|
| B1 | e,f,g,h,i,j | $1 \leq num, num < 10$ |
| B2 | e,f,g,h,i,j | $num < 1, 10 \leq num$ |
| ⋮ | ⋮ | ⋮ |

FIG.26C

NEW ROUTE PATTERN INFORMATION — NRPT

| NAME OF ROUTE PATTERN | EXECUTION FLAG | NUMBER OF UNTESTED ROUTE PATHS |
|---|---|---|
| a-b-d-B1 | off | 4 |
| a-c-d-B2 | off | 4 |
| a-c-d-B1 | off | 4 |
| a-b-d-B2 | off | 4 |

FIG.29A

NRPH

NEW ROUTE PATH INFORMATION

| NAME OF ROUTE PATH | EXECUTION FLAG |
|---|---|
| a | on |
| b | on |
| c | off |
| d | on |
| B1 | on |
| B2 | off |

FIG.29B

NRPT

NEW ROUTE PATTERN INFORMATION

| NAME OF ROUTE PATTERN | EXECUTION FLAG | NUMBER OF UNTESTED ROUTE PATHS |
|---|---|---|
| a-b-d-B1 | on | 0 |
| a-c-d-B2 | off | 2 |
| a-c-d-B1 | off | 1 |
| a-b-d-B2 | off | 1 |

FIG.32

| STEP | THE NAME OF A BRANCH GROUP | PROCESSING | ROUTE PATH | BRANCH ROUTE PATH | |
|---|---|---|---|---|---|
| | | | | Nest1 | Nest2 |
| 1 | | function(01): | a | | |
| 2 | ↑ | if (x1>y1) | b | A1-1 | |
| 3 | \| A1 | function(02): | b | | |
| 4 | \| | else | c | A1-2 | |
| 5 | ↓ | function(03): | c | | |
| 6 | | function(04): | d | | |
| 7 | ↑ | if (x2>y2) { | e | B1-1 | |
| 8 | \| B1 | function(05): | e | | |
| 9 | \| ↑ | if (x3>y3) | f | | B2-1 |
| 10 | \| \| B2 | function(06): | f | | |
| 11 | \| \| | else | g | | B2-2 |
| 12 | \| ↓ | function(07): | g | | |
| 13 | \| | function(08): | h | | |
| 14 | \| | } | | | |
| 15 | \| | else { | i | B1-2 | |
| 16 | \| | function(09): | i | | |
| 17 | ↓ | } | i | | |
| 18 | | function(10): | j | | |
| 19 | ↑ | switch(x4){ | | | |
| 20 | \| C1 | case1:function(11):break: | k | C1-1 | |
| 21 | \| | case2:function(12):break: | l | C1-2 | |
| 22 | \| | case3:function(13):break: | m | C1-3 | |
| 23 | \| | case4:function(14):break: | n | C1-4 | |
| 24 | \| | case5:function(15):break: | o | C1-5 | |
| 25 | ↓ | } | | | |
| 26 | | function(16): | p | | |

FIG.35

| ORDER OF TEST | BRANCH ROUTE TESTING STATE | BRANCH ROUTE PATH TO BE TESTED NEXT |
|---|---|---|
| (EXAMPLE) | BRANCH GROUP A1:(A1-1)(A1-2)<br>BRANCH GROUP B1:(B1-1)(B1-2)<br>B2:(B2-1)(B2-2)<br>BRANCH GROUP C1:(C1-1)(C1-2)(C1-3)(C1-4)(C1-5) | |
| ○ (INITIAL STATE) | BRANCH GROUP A1:(0)(0)<br>BRANCH GROUP B1:(0)(0)<br>B2:(0)(0)<br>BRANCH GROUP C1:(0)(0)(0)(0)(0) | A1-1<br>B1-1<br>B2-1<br>C1-1 |
| 1 | BRANCH GROUP A1:(1+)(0)<br>BRANCH GROUP B1:(1+)(0)<br>B2:(1+)(0)<br>BRANCH GROUP C1:(1+)(0)(0)(0)(0) | A1-2<br>B1-2<br>B2-2<br>C1-2 |
| 2 | BRANCH GROUP A1:(1)(1+)<br>BRANCH GROUP B1:(1)(1+)<br>B2:(1)(0)<br>BRANCH GROUP C1:(1)(1+)(0)(0)(0) | A1-1<br>B1-2<br>B2-2<br>C1-3 |
| 3 | BRANCH GROUP A1:(2+)(1)<br>BRANCH GROUP B1:(1)(2+)<br>B2:(1)(0)<br>BRANCH GROUP C1:(1)(1)(1+)(0)(0) | A1-2<br>B1-1<br>B2-2<br>C1-4 |
| 4 | BRANCH GROUP A1:(2)(2+)<br>BRANCH GROUP B1:(2+)(2)<br>B2:(1)(1+)<br>BRANCH GROUP C1:(1)(1)(1)(1+)(0) | A1-1<br>B1-1<br>B2-1<br>C1-5 |
| 5 | BRANCH GROUP A1:(3+)(2)<br>BRANCH GROUP B1:(3+)(2)<br>B2:(2+)(1)<br>BRANCH GROUP C1:(1)(1)(1)(1)(1+) | A1-2<br>B1-2<br>B2-2<br>C1-5 |

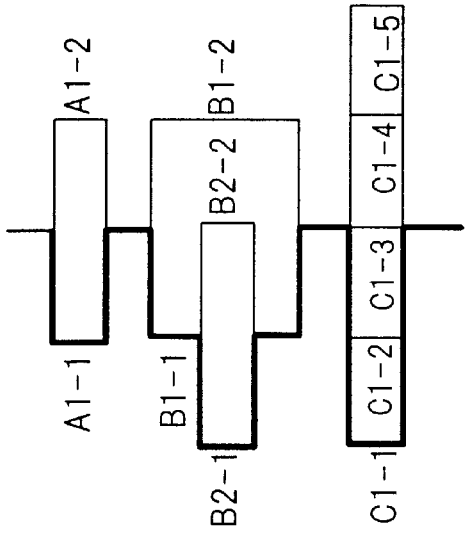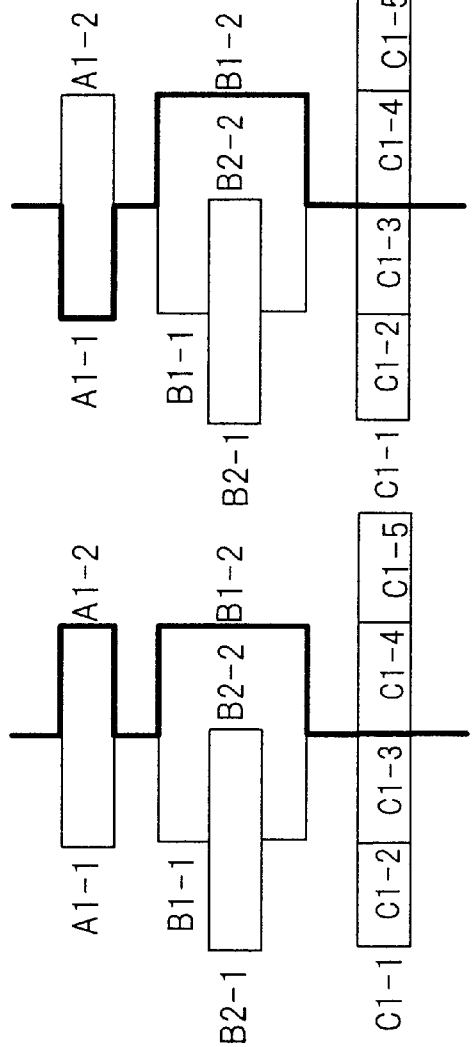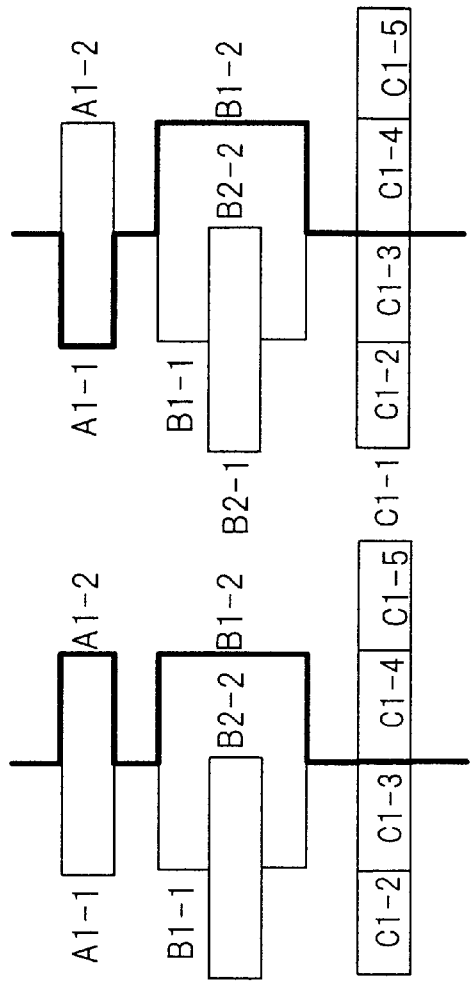

ROUTE TESTED
AT A FOURTH TIME

ROUTE TESTED
AT A FIFTH TIME

METHOD OF DETERMINING THE ROUTE TO BE TESTED IN A LOAD MODULE TEST

BACKGROUND OF THE INVENTION

The present invention relates to a method of determining a route to be tested in a load module test and, more particularly, to a method of determining a route to be tested in a load module test which is capable of storing the tested route paths and efficiently executing untested route paths at the time of testing a load module (program).

When a program for solving a large problem is composed, it is usually divided into several processes at the stage of planning the program, the modules obtained as a result of division are programmed by different one or more programmers separately from each other, and the programmed modules are compiled and linked through a linkage editor to produce the program for solving the problem.

Such a programming method adopting a division and group work system produces the following advantages:

(1) It is possible to shorten the time required for programming.

(2) Since it is possible to test the modules separately from each other before they are compiled and linked, debugging is facilitated and an accurate testing is enabled.

(3) It is not necessary to translate all the programs at each testing, and it is enough to pick out only an incomplete module and translate and check it.

FIG. 38 is an explanatory view of the above-described programming method. A problem is divided into four modules A to D, the modules (program modules) are programmed by programmers A to D, respectively, and the program modules are compiled and linked to produce a program for solving the problem.

In this manner, each program module is a partial or whole program which can be modified and replaced without influencing another partial program. There are three types of modules in such a program module. That is, they are (1) a source module, (2) an object module, and (3) a load module, as shown in FIG. 39. The source module is an input unit to a language translator (compiler), and it is composed of a series of statements written by a programmer. The object module is a module of a machine language which is output from a compiler, and the load module is produced by linking more than one object modules, or an object module and a load module by a linkage editor.

In order to assure the quality of a program, it is essential to test all the route paths of a load module. It is therefore required to execute the testing of all the route paths as quickly as possible. The route path is the minimum branch condition section produced when the source modules constituting the load module are compiled.

However, in a large-scale testing of a load module which is constituted by a plurality of source modules, since the load module contains a large number of branch instructions, subroutine execution instructions, etc., the routes to be tested become complicated. For this reason, it takes a long time to test the routes and, besides, it is sometimes the case that only a specific route path is tested plural times.

It is therefore necessary to extract the information for effectively testing all the route paths and to provide the information to the test executing means. Conventionally, however, there has existed no testing system which is capable of testing a load module in the minimum time by reducing the items to be tested to the minimum. In the prior art, tested route paths are stored, the coverage ratio (=the number of tested route paths/the number of all the route paths) is measured, and on the basis of the coverage ratio information, a tester tests an untested route path from his experience or at random.

SUMMARY OF THE INVENTION

Accordingly, it is an object of the present invention to eliminate the above-described problems in the related art and to provide a method of determining a route to be tested which is capable of efficiently testing all the route paths to be tested in a load module test.

It is another object of the present invention to provide a method of determining a test route to be tested which is capable of efficiently testing all the route paths to be tested including a subroutine in a load module test.

It is still another object of the present invention to provide a method of determining a route to be tested which is capable of executing a higher-quality test by managing the number of untested minimum route patterns for each route pattern in a load module test.

It is a further object of the present invention to provide a method of determining a route to be tested in a load module test which is capable of effectively testing a modified part in a short time when the part of the load module is modified.

It is a still further object of the present invention to provide a method of determining a route to be tested in a load module test which is capable automatically selecting an untested route path so that each route path is tested equally to the utmost, raising the branch coverage ratio and enabling a higher-quality test.

To achieve these ends, in the present invention, an untested route pattern is tested, thereby (a) the current state of the testing of all the route patterns is managed with the untested route pattern changed to a tested route pattern, (b) the current state of the testing of all the route paths is managed with the route paths constituting the untested route pattern changed to tested route paths, and (c) the number of untested route paths for each untested route patterns is managed, and then in the untested route patterns, the one which is constituted by the largest number of untested route paths is determined to be the route pattern to be tested next. The thus-determined route pattern is tested and thereafter, route patterns to be tested are successively determined and tests are executed until there exists no untested route path. In this manner, since route patterns are tested by priority of the number of untested route paths constituting them, it is possible to efficiently test all the route paths.

In the present invention, when there are a plurality of untested route patterns which contain the largest number of untested route paths, the untested route pattern in which the number of steps of execution is the smallest is determined to be the route pattern to be tested next. In this manner, it is possible to efficiently test all the route paths.

In the present invention, with respect to a route pattern containing a route path which calls and executes a subroutine, the number of untested route paths except the route path containing the subroutine and the number of untested route paths in the subroutine are managed, respectively, and the numbers of these untested route paths are added up as the total number of untested route paths in the route pattern. A route pattern which is constituted by the largest number of untested route paths is determined to be the route pattern to be tested next. In this manner, in a load module test containing a process for calling and executing a subroutine, it is possible to effectively test a route path including a subroutine.

In the present invention, (a) when a load module is modified, the route paths which are not influenced by the modification are collected in the form of a block, and a route block is defined with various entry conditions into the block, (b) a route pattern is specified by using route paths and route blocks, (c) a route pattern which is constituted by the largest number of untested route paths and untested route blocks is determined to be the route pattern to be tested next, and (d) route patterns to be tested are successively determined and tests are executed until there exists no untested route path nor untested block. In this manner, when a part of a load module is modified, it is possible to effectively test the modified part in a short time with the combination of the modified part and the unmodified part taken into consideration.

In the present invention, two consecutive route paths are defined as a minimum route pattern and an untested route pattern is tested, thereby (a) the current state of the testing of all the route patterns is managed with the untested route pattern changed to a tested route pattern, (b) the current state of the testing of all the minimum route patterns is managed with the minimum route patterns defined by the route paths which specify the untested route pattern changed to tested minimum route patterns, and (c) the number of untested minimum route patterns in the untested route patterns is managed, and then in the untested route patterns, the one which is constituted by the largest number of untested minimum route patterns is determined to be the route pattern to be tested next. Route patterns to be tested are successively determined and tests are executed until there exists no untested minimum route pattern. In this manner, since it is possible to make a pair of consecutive route patterns and manage the state of the testing of the pairs of route patterns, it is possible to execute a high-quality test.

In the present invention, in order to specify a route to be tested, the number of times each branch route path in each of branch points has been selected is managed, the route to be tested next is determined by selecting a branch route path which has the smallest number of times in each branch point, and routes to be tested are determined and tested until there exists no untested branch route path. In this manner, it is possible to automatically select an untested route path so that each route path is tested equally, raise the branch coverage ratio and enable a higher-quality test.

Other features and advantages of the present invention will be apparent from the following description taken in conjunction with the accompanying drawings.

BRIEF DESCRIPTION OF THE DRAWINGS

FIG. 8 is an explanatory view of test execution trace information;

FIGS. 9A to 9C are explanatory views of route pattern information;

FIG. 10 is a flow chart of a process of determining and testing the route pattern to be tested in the second embodiment;

FIG. 14 is an explanatory view of route path/route pattern information;

FIG. 15 is an explanatory view of a combination of route patterns;

FIG. 16 is an explanatory view of untested route paths in each function;

FIG. 17 is an explanatory view of route path/route pattern information after a testing;

FIG. 18 is a flow chart of a process of determining and testing the route pattern to be tested in the third embodiment;

FIG. 21 shows the structure of a fourth embodiment of a load module testing system according to the present invention;

FIGS. 26A to 26C are explanatory views of new and old route pattern information and route block information;

FIGS. 29A and 29B are explanatory views of new route path information and new route pattern information, respectively, after the testing of a predetermined route pattern;

FIG. 32 is an explanatory view of the correspondence of processing, a branch group, a route path, a branch route path, etc. in a source module;

FIG. 35 is an explanatory view of the result of a route pattern selecting process in the sixth embodiment;

FIGS. 36A to 36C are explanatory views of tested route patterns in the sixth embodiment;

DESCRIPTION OF THE PREFERRED EMBODIMENTS

(A) First Embodiment

Figure 1:
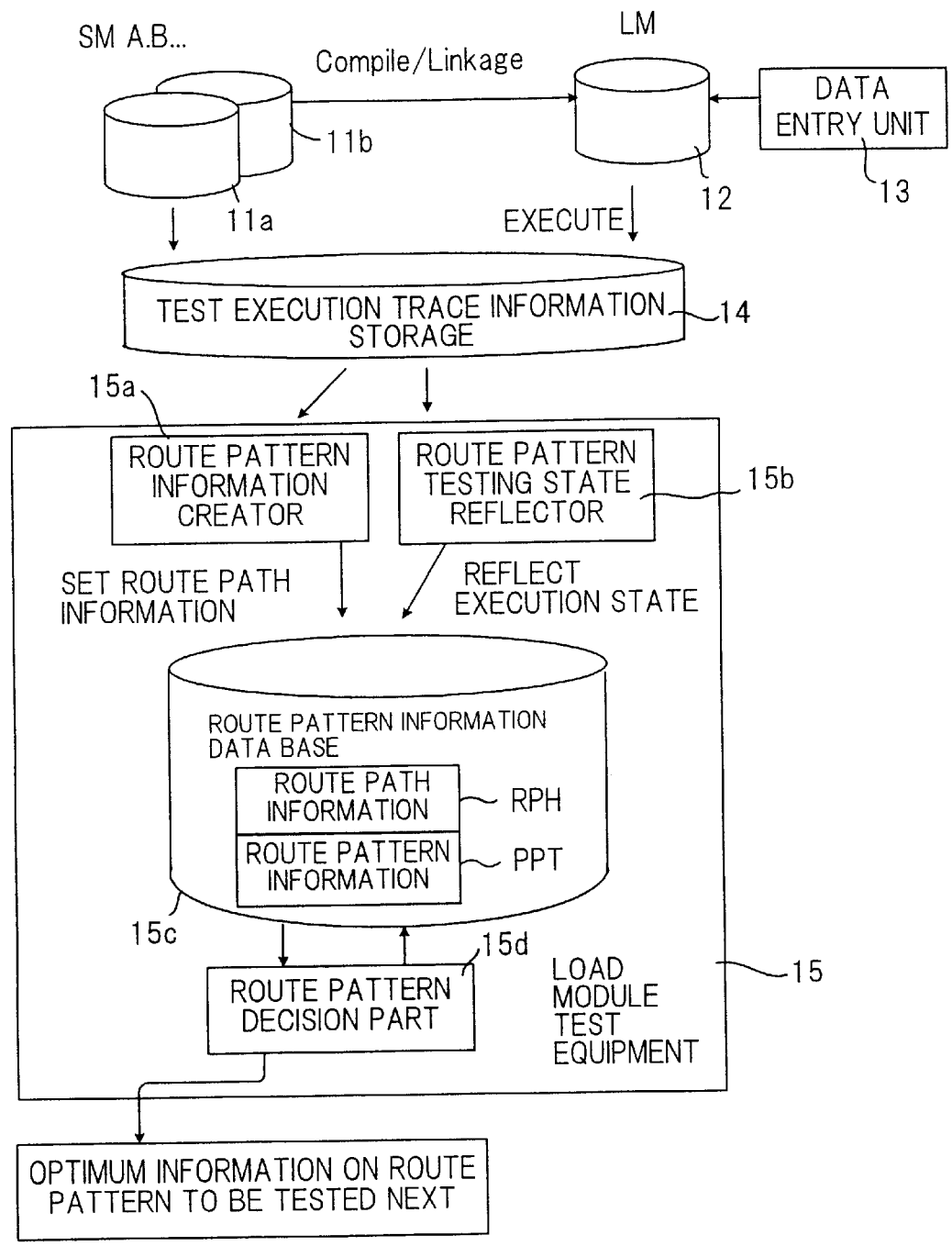
FIG. 1 shows the structure of a first embodiment of a load module testing system according to the present invention.

FIG. 1 shows the structure of a first embodiment of a load module testing system according to the present invention. In FIG. 1, the reference numerals 11a and 11b represent source modules, 12 a load module created by translating and link editing the source modules 11a, 11b by a compiler and a linkage editor, 13 a data entry unit for inputting test data, an entry condition and the like, and 14 a test execution trace information storage for storing (1) all the minimum branch condition sections (all the route paths) that are produced when the source modules are compiled, (2) the route patterns for specifying all the routes existing from the start to the end of the load module, (3) the route paths which are passed when a route is tested, and the like. The reference numeral 15 denotes a load module testing equipment, which includes a route pattern information creator 15a, a route pattern testing state reflector 15b, a route pattern information data base 15c and a route pattern decision portion 15d for determining the route pattern to be tested next.

Figures 2, 3:
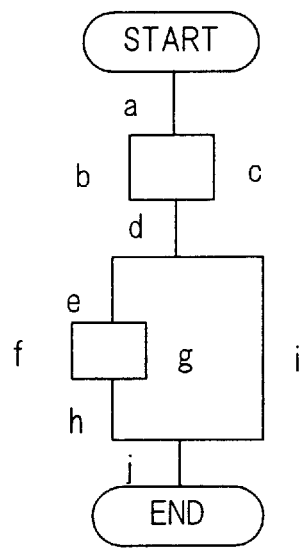
FIG. 2 is an explanatory view of a stored route pattern information data base.
FIG. 3 is a flow chart of a load module testing process.

The route pattern information creator 15a creates route path information RPH and route pattern information RPT shown in FIG. 2 by using the data stored in the test execution trace information storage 14, and stores them in the route pattern information data base 15c. The route path information RPH is information showing the correspondence of each of all the route paths in the load module and an execution flag. At the initial stage, since no route path has been passed (tested) yet, the initial value of the execution flag is OFF. FIG. 3 is a flow chart of a load module using a route path as an element. The symbols a to j represent route paths, which are listed in the route path column in FIG. 2. The route pattern information RPT is information showing the correspondence of each of the route patterns for specifying all the routes existing from the start to the end in the load module, an execution flag showing whether or not the route pattern has been tested, the number of untested route paths contained in each route pattern, etc. The load modules in FIG. 3 includes six routes (route patterns): abdefhj, abdeghi, abdij, acdefhj, acdeghj and acdij which are listed in the route pattern column in the route pattern information RPT in FIG. 2.

Figure 4:
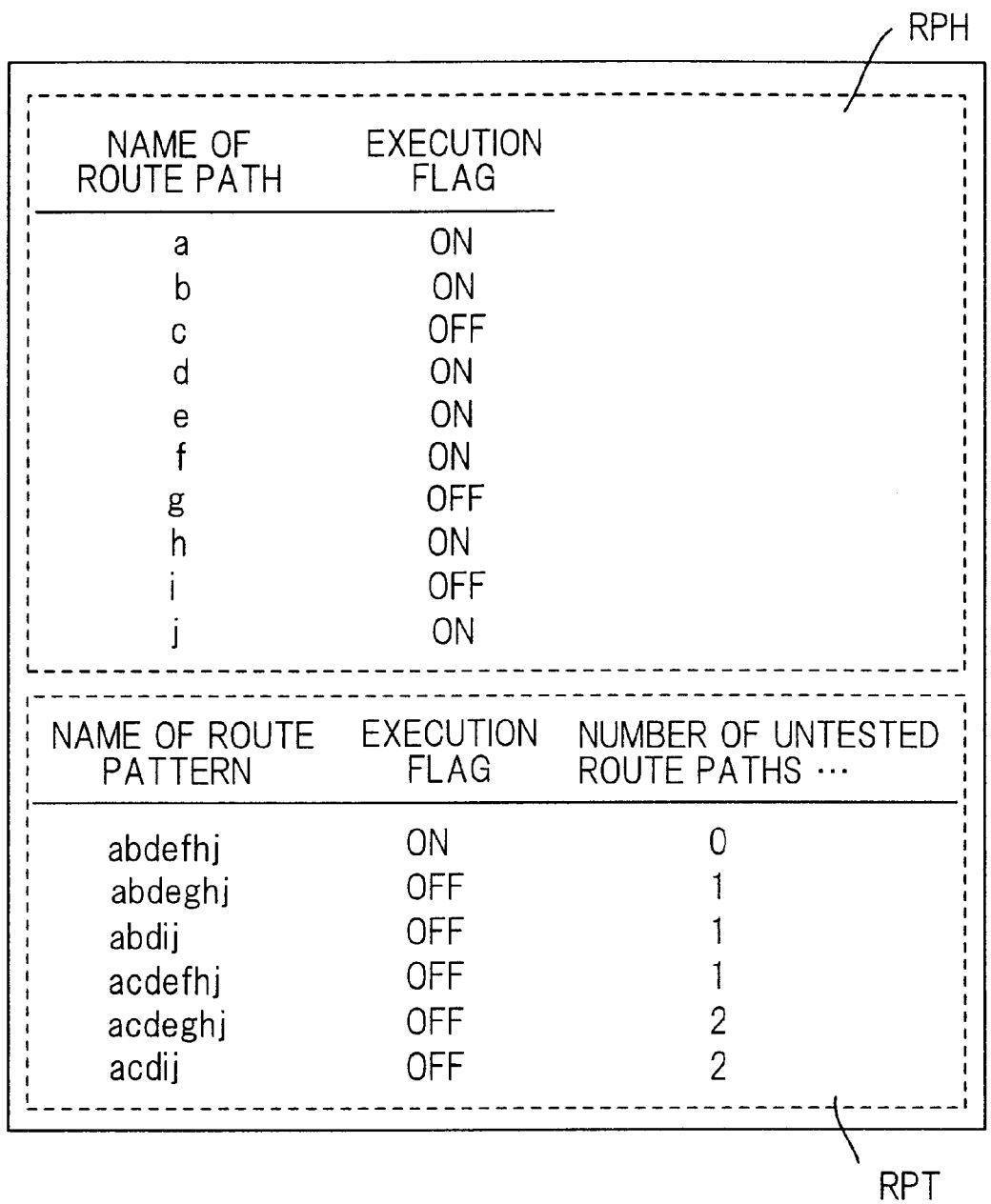
FIG. 4 is an explanatory view the data base after testing a predetermined route pattern.

The route pattern testing state reflector 15b reflects the route pattern testing state to the route pattern information data base 15c by reference to the names of the tested route patterns and the names of the tested route paths which are stored in the test execution trace information storage 14, after a predetermined route pattern has been tested. For example, when the route pattern abdefhj is tested, the route path information RPH and the route pattern information RPT change as shown in FIG. 4. The route pattern decision portion 15d arranges the route patterns in the route pattern information RPT by priority of the number of untested route paths, and determines the route pattern containing the largest number of untested route paths to be the route pattern to be tested next. For example, at the initial stage, one of the route patterns: abdefhj, abdeghi, acdefhj and acdeghj shown in FIG. 2 is determined to be the route pattern to be tested next. In the case of FIG. 4, either of the route patterns: acdeghj and acdij is determined to be the route pattern to be tested next.

Figure 5:
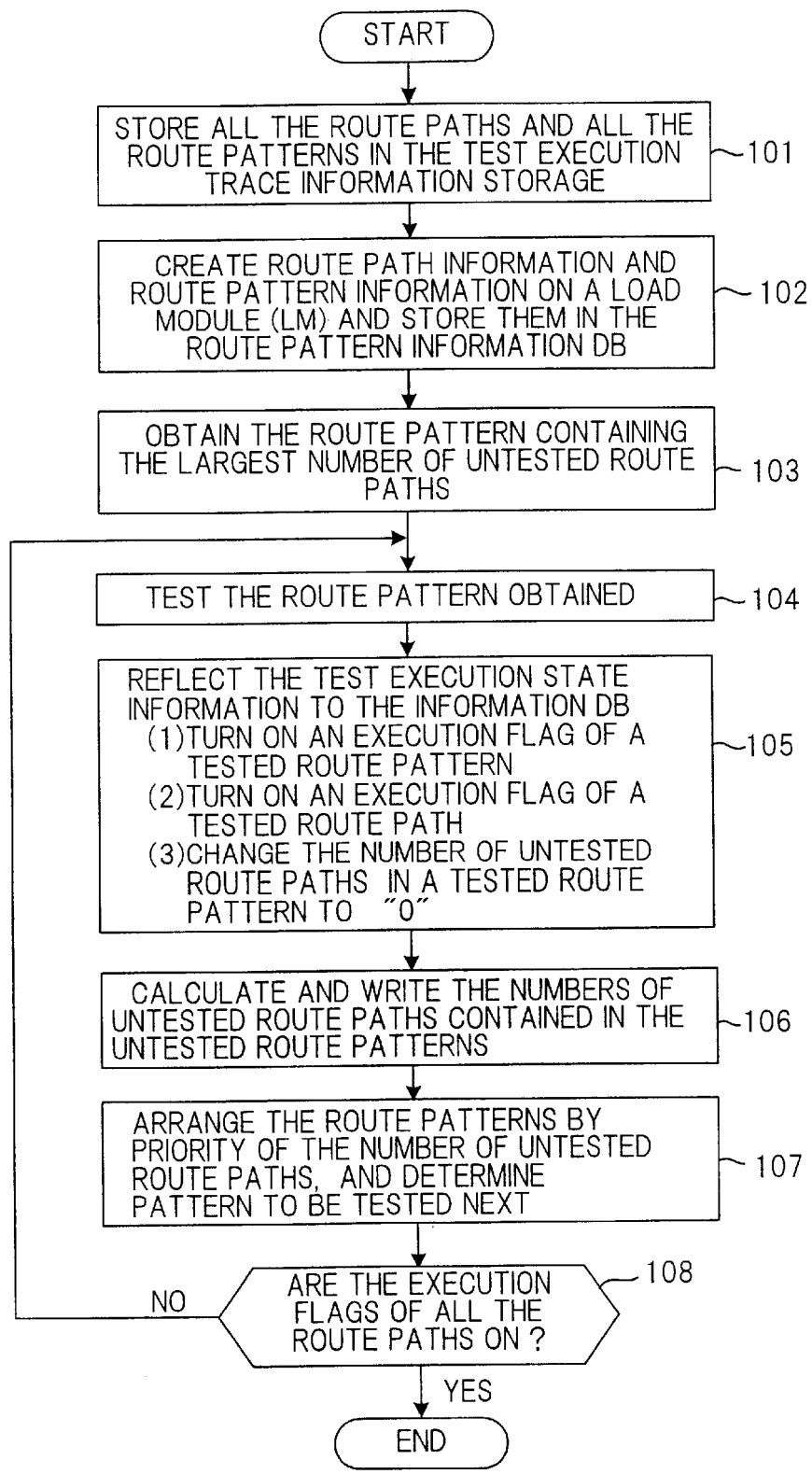
FIG. 5 is a flow chart of a process of determining and testing the route pattern to be tested in the first embodiment.

FIG. 5 is a flow chart of a process of determining and testing a pattern to be tested in the first embodiment.

All the route paths that are produced when the source modules are compiled and all the route patterns that are specified by the route paths are stored in the test execution trace information storage 14 (step 101).

The route pattern information creator 15a then creates the route path information RPH and route pattern information RPT shown in FIG. 2 by using the data stored in the test execution trace information storage 14 and stores them in the route pattern information data base 15c (step 102).

Thereafter, the route pattern decision portion 15d arranges the route patterns in the route pattern information RPT by priority of the number of untested route paths, and determines the route pattern containing the largest number of untested route paths to be the route pattern to be tested next (step 103).

Each branch condition is set so that the load module may be executed along the determined pattern, and the load module is started. The load module is executed along the determined route pattern, and the tested route paths are stored in the test execution trace information storage 14 (step 104).

The route pattern testing state reflector 15b reflects the route pattern testing state to the route pattern information data base 15c by reference to the names of the tested route patterns and the names of the tested route paths which are stored in the test execution trace information storage 14. More specifically, the route pattern testing state reflector 15b (1) records the tested route pattern as tested (turns ON the execution flag), (2) records each route path constituting the tested route pattern as tested (turns ON the execution flag), and (3) records the number of untested route paths of the tested route pattern as 0, as shown in FIG. 4 (step 105).

The route pattern testing state reflector 15b then calculates the number of untested route paths constituting each of the untested route patterns and updates the numbers of untested route paths in the route pattern information RPT (step 106).

When the numbers of untested route paths in the route pattern information RPT are updated, the route pattern decision portion 15d arranges the route patterns in the route pattern information RPT by priority of the number of untested route paths, and determines the route pattern containing the largest number of untested route paths to be the route pattern to be tested next (step 107).

A test execution portion then judges whether or not the execution flags of all the route paths are ON by reference to the route path information RPH (step 108), and if the answer is in the negative, the processing from the step 104 on is repeated. If the answer is in the affirmative, the testing of the load module is finished.

According to the first embodiment, since the untested route pattern containing the largest number of untested route paths is determined to be the route pattern to be tested next, it is possible to raise the coverage ratio of the tested route paths, thereby efficiently testing all the route paths.

(B) Second Embodiment

In the first embodiment, the route pattern containing the largest number of untested route paths is determined to be the route pattern to be tested next, and if there are a plurality of route patterns containing the largest number of untested route paths, an optional route pattern is used as the route pattern to be tested next. In a second embodiment, however, the number of steps for executing instructions along each route pattern is obtained, and the route pattern in which the number of steps is the smallest is determined to be the route pattern to be tested next.

Figure 6:
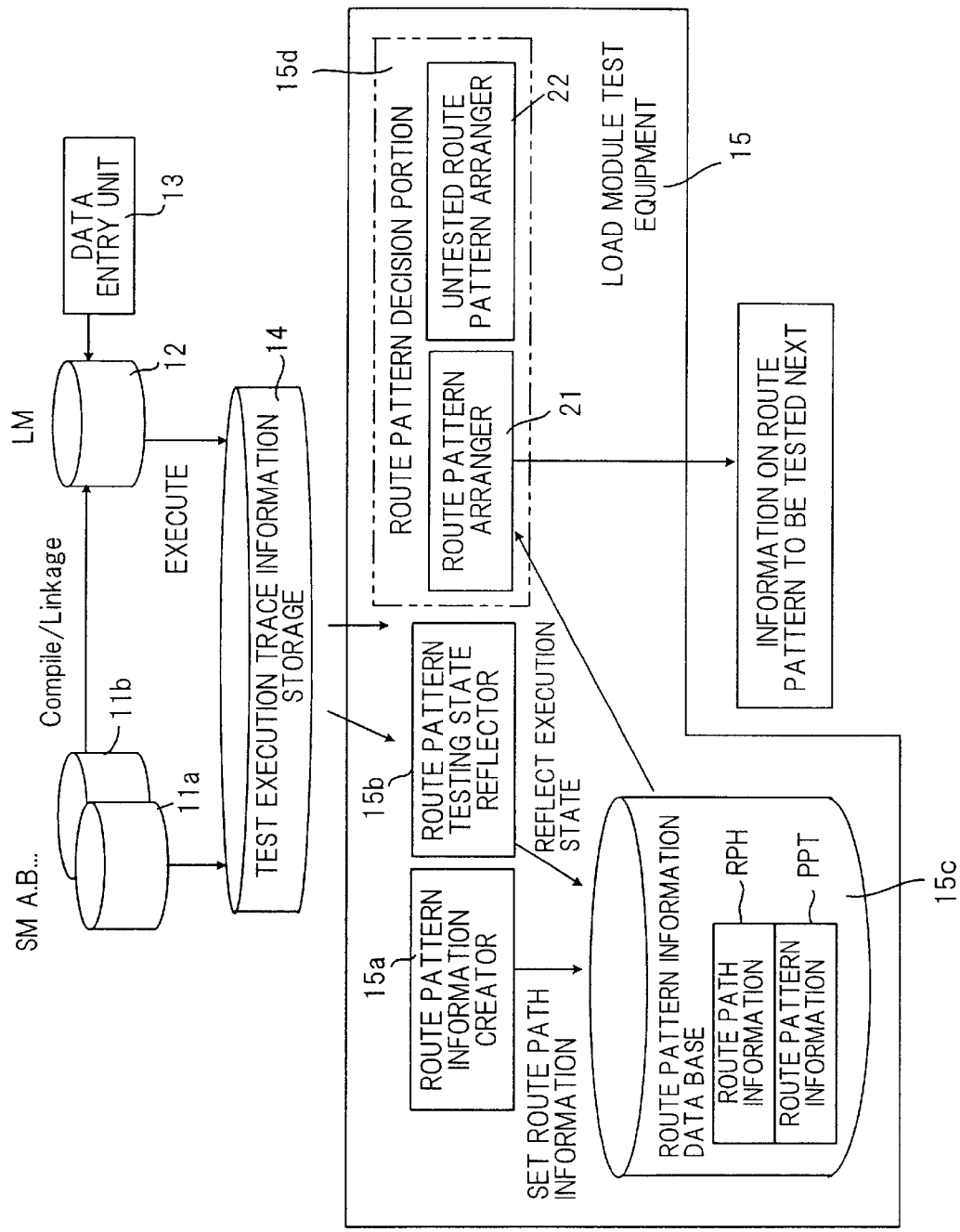
FIG. 6 shows the structure of a second embodiment of a load module testing system according to the present invention.
Figure 7A:
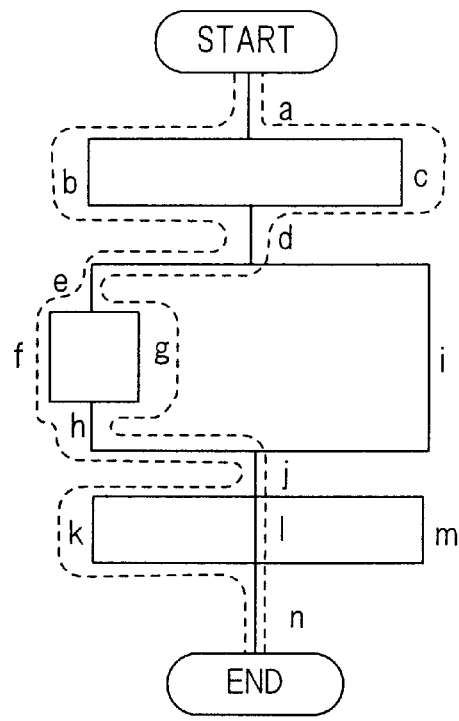
FIGS. 7A and 7B are flow charts of a load module testing process.
Figure 7B:
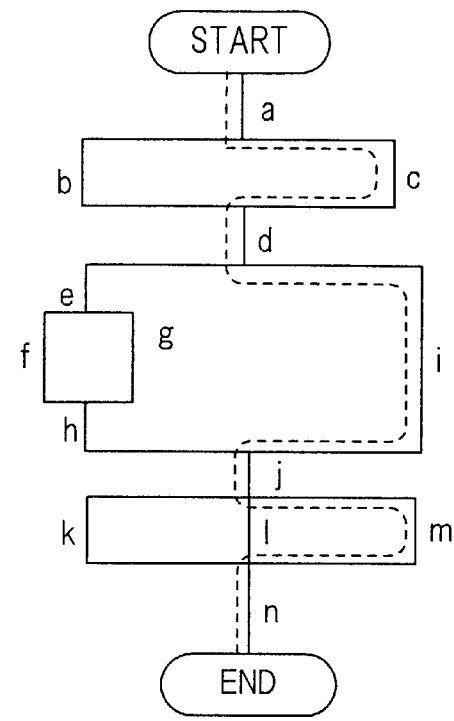

FIG. 6 shows the structure of a second embodiment of a load module testing system according to the present invention. The same reference numerals are provided for the elements which are the same as those in the first embodiment shown in FIG. 1. In FIG. 6, the reference numerals 11a and 11b denote source modules, 12 a load module, 13 a data entry unit for inputting test data, an entry condition and the like, and 14 a test execution trace information storage for storing (1) the route paths produced when the source modules are compiled, the steps for executing them, etc., (2) route patterns for specifying all the routes existing from the start to the end of the load module, (3) the route paths which are passed when a load module is tested along a predetermined route pattern, and the like. For example, if the flow of the process of testing the load module 12 (using the route path as an element) is the one shown in FIG. 7A or 7B, the names a to n of the route paths and the number of steps are stored in the test execution trace information storage 14, as shown in FIG. 8.

The reference numeral 15 denotes a load module testing equipment, which includes a route pattern information creator 15a, a route pattern testing state reflector 15b, a route pattern information data base 15c and a route pattern decision portion 15d.

The route pattern information creator 15a creates route path information RPH and route pattern information RPT shown in FIG. 2 by using the information stored in the test execution trace information storage 14 and stores them in the route pattern information data base 15c. The route path information RPH is information showing the correspondence of each of all the route paths in the load module and an execution flag (see FIG. 2) as in the first embodiment. The route pattern information RPT is information showing (1) the route patterns for specifying all the routes existing in the load module, (2) an execution flag showing whether or not each route pattern has been tested, (3) the number of untested route paths contained in each route pattern, and (4) the total number of steps for executing the route paths constituting the route pattern. For example, the numbers of steps in the route patterns abdijmn and acdijmn are "abdijmn" = 500 + 600 + 700 + 300 + 600 + 600 + 200

= 3500

"acdijmn" = 500 + 300 + 700 + 300 + 600 + 600 + 200

= 3200.

The route pattern testing state reflector 15b reflects the route pattern testing state to the route pattern information data base 15c by reference to the names of the tested route patterns and the names of the tested route paths which are stored in the test execution trace information storage 14. For example, when the two route patterns acdeghjln and abdefhjkn (see the dot lines in FIG. 7A) are tested, the route pattern information RPT becomes as shown in FIG. 9A. The execution flags of the route paths a, b, c, d, e, f, g, h, j, k, l, and n in the route path information RPH are turned ON (not shown).

The route pattern decision portion 15d is provided with a route pattern arranger 21 for arranging the route patterns by priority of the number of untested route paths, as shown in FIG. 9B, and an untested route pattern arranger 22 for arranging the route patterns which have the same number of untested route paths in an ascending order of the number of steps for executing them, as shown in FIG. 9C. Thus, the route pattern acdijmn (the dotted line in FIG. 7B) which has the largest number of untested route paths and the smallest number of steps for executing them is determined to be the route pattern to be tested next.

FIG. 10 is a flow chart of a process of determining the pattern to be tested and executing a test in the second embodiment.

All the route paths that are produced when the source modules are compiled, the number of steps in each route path and all the route patterns that are specified by the route paths are stored in the test execution trace information storage 14 (step 201).

The route pattern information creator 15a then creates the route path information RPH and route pattern information RPT (including the number of untested route paths and the number of steps for executing them) by using the information stored in the test execution trace information storage 14 and stores them in the route pattern information data base 15c (step 202).

Thereafter, the route pattern decision portion 15d arranges the route patterns stored in the 15c by priority of the number of untested route paths, and if there are a plurality of route patterns containing the same number of untested route paths, they are arranged in an ascending order of the number of steps for executing them, and thereafter, it determines the route pattern containing the largest number of untested route paths and the smallest number of steps for executing them to be the route pattern to be tested next (step 203).

Each branch condition is set so that the load module may be executed along the determined pattern, and the load module is started. The load module is executed along the determined route pattern, and the tested route paths are stored in the test execution trace information storage 14 (step 204).

The route pattern testing state reflector 15b reflects the route pattern testing state to the route pattern information data base 15c by reference to the names of the tested route patterns and the names of the tested route paths which are stored in the test execution trace information storage 14. More specifically, the route pattern testing state reflector 15b (1) records the tested route pattern as tested (turns ON the execution flag), (2) records each route path specifying the tested route pattern as tested (turns ON the execution flag), and (3) records the number of untested route paths of the tested route pattern as 0, as shown in FIG. 9A (step 205).

The route pattern testing state reflector 15b then calculates the number of untested route paths constituting each of the untested route patterns and updates the numbers of untested route paths in the route pattern information RPT. Thereafter the route pattern decision portion 15d arranges the route patterns by priority of the number of untested route paths (step 206).

The route pattern decision portion 15d also arranges the route patterns containing the same number of untested route paths in an ascending order of the number of steps for executing them (step 207), and determines the route pattern containing the largest number of untested route paths and the smallest number of steps for executing them to be the route pattern to be tested next (step 208).

A test execution portion then judges whether or not the execution flags of all the route paths are ON by reference to the route path information RPH (step 209), and if the answer is in the negative, the processing from the step 204 are repeated. If the answer is in the affirmative, the testing of the load module is finished.

According to the second embodiment, since the untested route pattern containing the largest number of untested route paths and the smallest number of steps for executing them is determined to be the route pattern to be tested next, it is possible to raise the coverage ratio of the tested route paths, thereby more efficiently testing all the route paths.

(C) Third Embodiment

Figure 11:
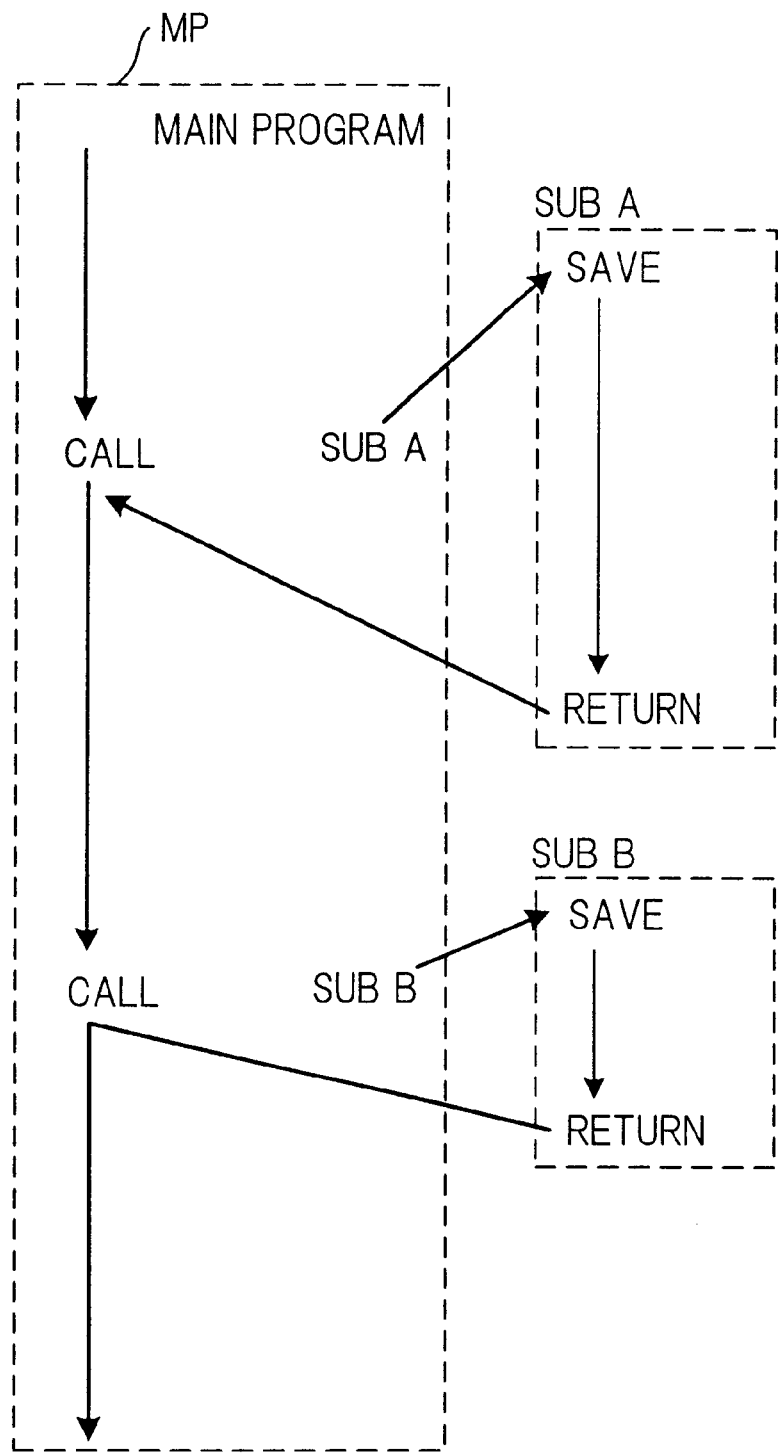
FIG. 11 is an explanatory view of the relationship between a main program and a subroutine.

A programming system in which a subroutine (subprogram) is created, the subroutine is called and executed in the main program, and after the execution of the subroutine, the process is returned to the main program for continuing the processing is generally adopted. FIG. 11 is an explanatory view of the relationship between such a main program and a subroutine. The symbol MP denotes a main program (module A) and SUB A and SUB B subroutines. A subroutine call instruction (CALL+the name of a subroutine) is inserted in a predetermined position of the main program so as to call the subroutine SUB A or SUB B. Instruction SAVE for saving the contents of the registers and the like used by the main program MP is inserted at the top of each of the subroutines SUB A and SUB B, and instruction RETURN for restoring them to the original state in which they are stored is inserted at the end thereof. At the time of programming, the main program MP and, each of the subroutines (source modules) SUB A and SUB B are created separately from each other, and the source modules are compiled and link edited to create an executable load module. Since the subroutine is equal to a function in the C language, it will be referred to as a function hereinafter. The main program will be referred to as a calling function and a function in the calling function as a function being called.

In determining the route pattern to be tested in a load module having a structure for calling a function and executing it, it is insufficient to determine the route pattern to be tested only by reference to the number of untested route paths in a calling function, and it is necessary to take the number of untested route paths in the function being called into consideration. In the third embodiment, the route pattern to be tested next is determined with the number of untested route paths in the function being called taken into consideration.

Figure 12:
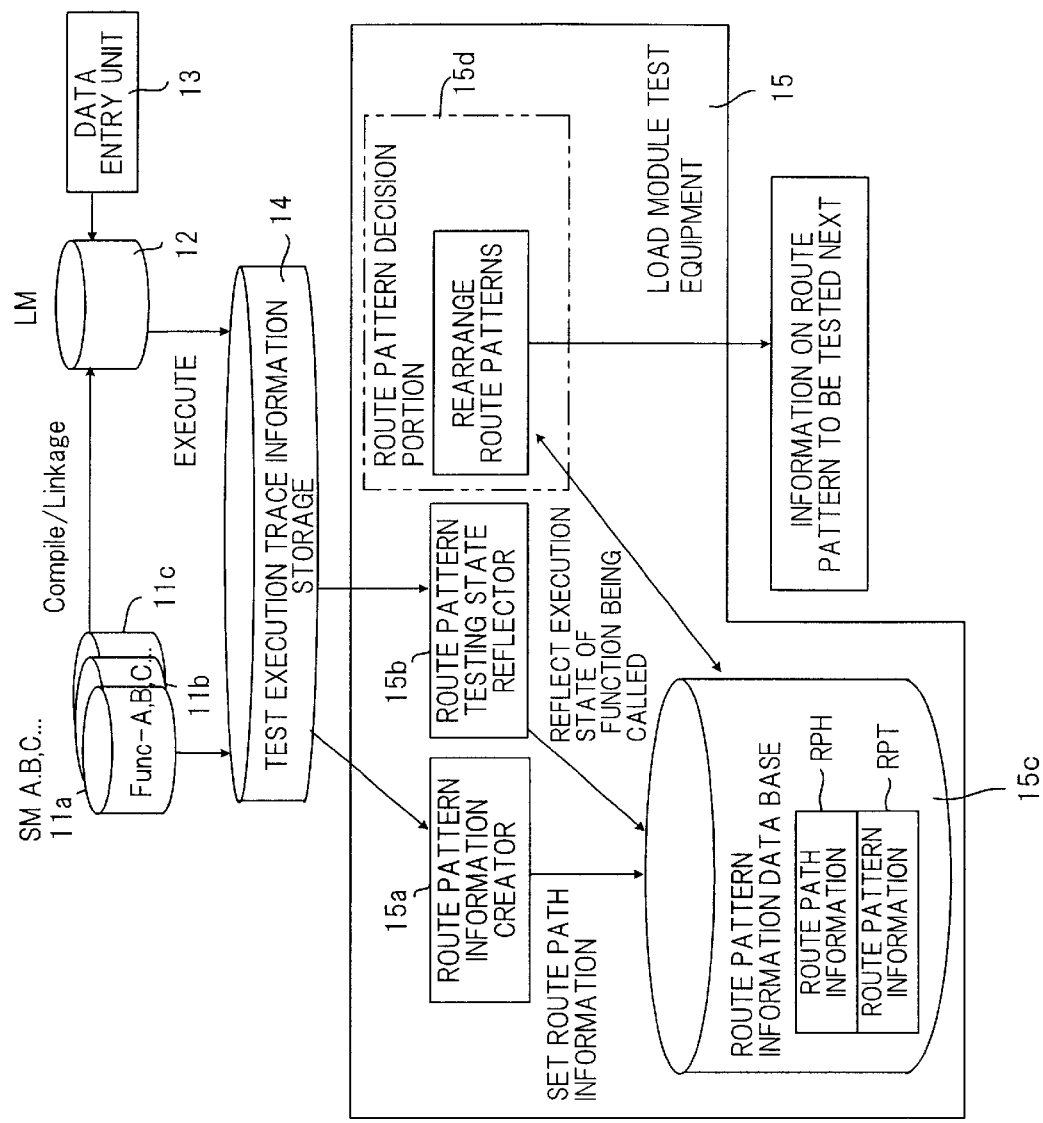
FIG. 12 shows the structure of a third embodiment of a load module testing system according to the present invention.
Figure 13A:
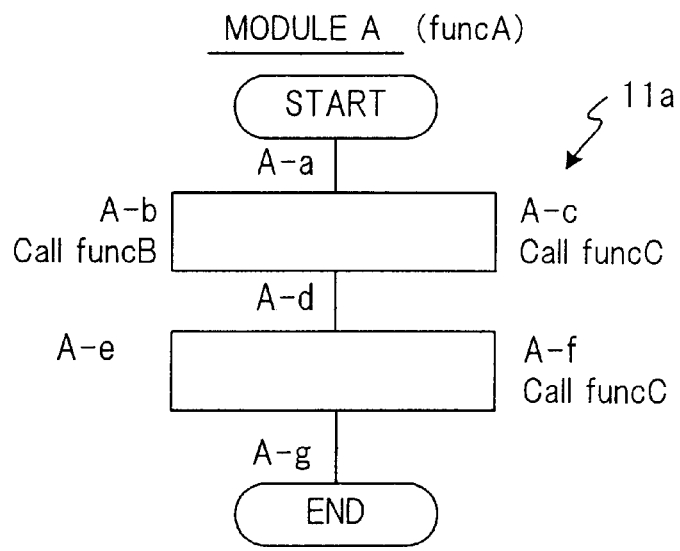
FIGS. 13A to 13C show examples of a combination of source modules (functions) which constitute a load module.
Figure 13B:
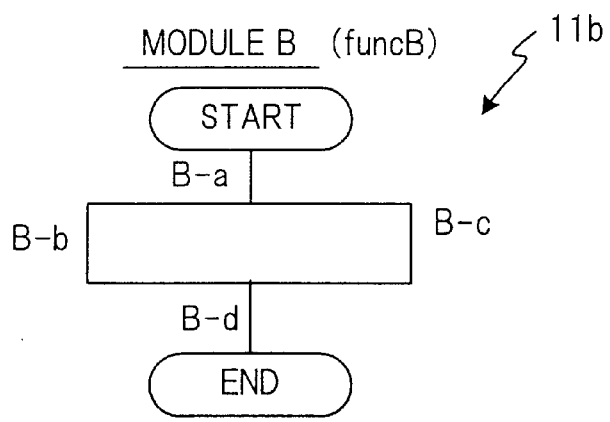
Figure 13C:
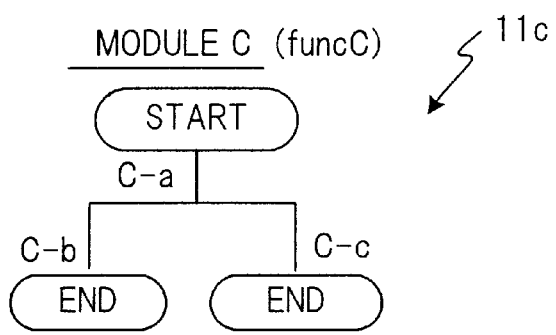
Figure 19:
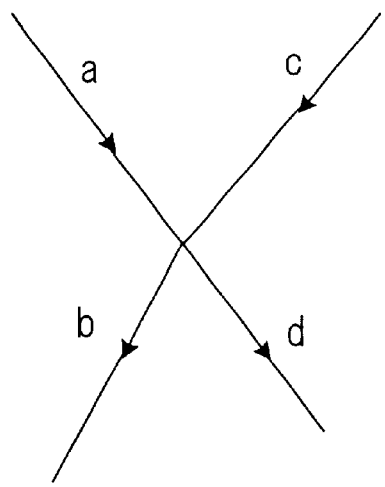
FIG. 19 is an explanatory view of the necessity of a minimum route pattern.

FIG. 12 shows the structure of a third embodiment of a load module testing system according to the present invention. The same numerals are provided for the elements which are the same as those in the first embodiment shown in FIG. 1. In FIG. 12, the reference numerals 11a to 11c denote source modules (modules A to C) having function names func-A, func-B and func-C, respectively, and 12 a load module created by translating and link editing the source modules A to C by a compiler and a linkage editor. The source modules A to C have processing programs shown in FIGS. 13A to 13C, respectively. In the source module A (function func-A), the symbols A-a to A-g represent route paths. The route path A-b calls and executes the function func B, and each of the route paths A-c and A-f calls and executes the function func C. The source module B (function func-b) and the source module C (function func-c) are modules called by the source module A, and the symbols B-a to B-d and C-a to C-c denote route paths.

The reference numeral 13 represents a data entry unit for inputting test data, an entry condition and the like, and 14 a test execution trace information storage for storing (1) the route paths produced when the source modules are compiled, (2) the correspondence of a route path to a function, (3) the route patterns for specifying all the routes existing from the start to the end of the load module, (4) the route paths which are passed when a load module is tested, and the like.

The reference numeral 15 denotes a load module testing equipment, which includes a route pattern information creator 15a, a route pattern testing state reflector 15b, a route pattern information data base 15c and a route pattern decision portion 15d.

The route pattern information creator 15a creates route path information RPH and route pattern information RPT by using the information stored in the test execution trace information storage 14 and stores them in the route pattern information data base 15c.

The route path information RPH shows the correspondence of the all the route paths A-a to A-g in the load module, a function call flag and an execution flag, as shown in the upper column of FIG. 14. The function call flag judges whether or not a route path is one which calls and executes a function, and the execution flag judges whether a route path is a tested one or an untested one. As to the route paths A-b, A-c and A-f, which call and executed a function, it is not necessary to write ON/OFF of an execution flag, and whether or not each of them has been tested is controlled in the route pattern information RPT. The route pattern information RPT shows the correspondence of (1) all the route patterns existing in the load module, (2) the number of untested route paths in a calling function, (3) the name of a function being called, (4) an execution flag showing whether or not the function being called has been tested, (5) the number of untested route paths in the function being called, (6) the total number of untested route paths, and the like, as shown in the lower column of FIG. 14. FIG. 15 shows a combination of route patterns in the load module shown in FIG. 13, and the symbol in a parenthesis represents the route path in a functions being called.

The route pattern testing state reflector 15b reflects the route pattern testing state to the route pattern information data base 15c when the load module is tested along a predetermined route patter. More specifically, the route pattern testing state reflector 15b calculates and updates (1) the execution flags in the route path information RPH, (2) the number of untested route paths in a calling function in the route pattern information RPT, (3) the execution flag of a functions being called, (4) the number of untested route paths in a function being called, (5) the total number of untested route paths in a calling function and a function being called, etc. For example, when the load module is tested along the route pattern:

A-a, A-b, (B-a, B-c, B-d), A-d, A-f, (C-a, C-c), A-g, the untested route paths in each function are as shown in FIG. 16. As a result, the route pattern testing state reflector 15b updates the route path information RPH and the route pattern information RPT as shown in FIG. 17.

The route pattern decision portion 15d arranges the route patterns by priority of the number of untested route paths, and determines the route pattern containing the largest number of untested route paths to be the route pattern to be tested next. For example, in the case shown in FIG. 17, since the number of untested route paths of the route pattern:

A-a, A-b, (B-a, B-b, B-d), A-d, A-f, (C-a, C-b), A-g becomes maximum (=5), it is determined to be the route pattern to be tested next.

FIG. 18 is a flow chart of a process of determining and testing a pattern to be tested in the third embodiment.

All the route paths that are produced when the source modules are compiled, all the route patterns that are specified by the route paths, the correspondence of a route path to a function being called, the route patterns of a function being called, etc. are stored in the test execution trace information storage 14 (step 301).

The route pattern information creator 15a then creates the route path information RPH and route pattern information RPT (see FIG. 14) by using the information stored in the test execution trace information storage 14 and stores them in the route pattern information data base 15c (step 302).

Thereafter, the route pattern decision portion 15d arranges the route patterns stored in the 15c by priority of the number of untested route paths, and determines the route pattern containing the largest number of untested route paths to be the route pattern to be tested next (step 303).

Each branch condition is set so that the load module may be executed along the determined pattern, and the load module is started. The load module is executed along the determined route pattern, and the tested route paths are stored in the test execution trace information storage 14 (step 304).

The route pattern testing state reflector 15b reflects the route pattern testing state to the route pattern information data base 15c by reference to the names of the tested route patterns and the names of the tested route paths which are stored in the test execution trace information storage 14. More specifically, the route pattern testing state reflector 15b (1) turns ON the execution flag of the route paths (except a route path calling a function) which constitute the tested route pattern, and (2) turns ON the execution flags of the route paths of a function being called (step 305).

The route pattern testing state reflector 15b then calculates the number of untested route paths constituting each of the untested route patterns, the number of untested route paths in a function being called, and the total number of untested route paths, and updates the contents of the route pattern information RPT (step 306).

Thereafter, the route pattern decision portion 15d arranges the route patterns by priority of the total number of untested route paths, and determines the route pattern having the largest total number of untested route paths to be the route pattern to be tested next (step 307).

A test execution portion then judges whether or not the execution flags of all the route paths are ON by reference to the route path information RPH and the route pattern information RPT (step 308), and if the answer is in the negative, the processing from the step 304 are repeated. If the answer is in the affirmative, the testing of the load module is finished.

According to the third embodiment, it is possible to efficiently test the route paths including a subroutine (function).

(D) Fourth Embodiment

In the first to third embodiments, the route pattern to be tested next is determined so as to efficiently test all the route paths. For this purpose, it is assumed that there is no problem if two closely related route paths are individually tested without any problem. For example, in the case in which it is necessary to test the routes ab, cb, ad, and cd in the routes shown in FIG. 9, only the routes ab and cd are tested in the first to third embodiments. In a fourth embodiment, two sequentially adjacent route paths are united as a minimum route pattern, and the route pattern to be tested next is determined so that all the minimum route patterns are efficiently tested, thereby heightening the test quality.

Figure 20A:
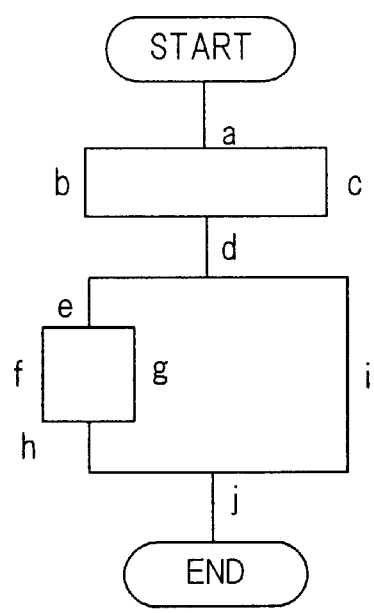
FIGS. 20A and 20B are explanatory views of a minimum route pattern.
Figure 20B:
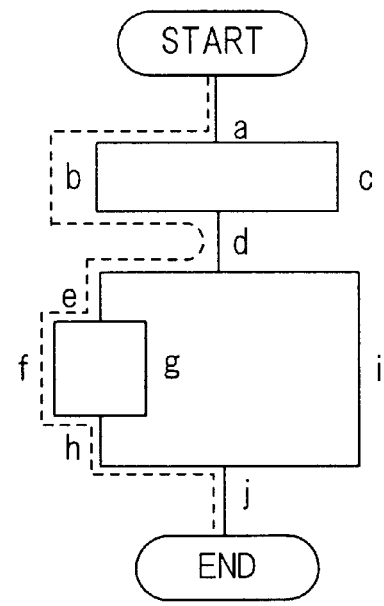

FIGS. 20A and 20B are flow charts of a load module explaining a minimum route pattern. In FIGS. 20A and 20B, the symbols a to j represent route paths. The minimum route pattern consists of two sequentially adjacent route paths. In these drawings, the minimum route patterns are a-b, a-c, b-d, c-d, d-e, d-i, e-f, e-g, f-h, g-h, h-J, and i-j.

FIG. 21 shows the structure of a fourth embodiment of a load module testing system according to the present invention. In FIG. 21, the reference numerals 11a and 11b represent source modules, 12 a load module created by translating and link editing the source modules 11a, 11b by a compiler and a linkage editor, 13 a data entry unit for inputting test data, a branch condition and the like, and 14 a test execution trace information storage for storing (1) all the route paths that are produced when the source modules are compiled, (2) a minimum route pattern consisting of two sequentially adjacent route paths, (3) the route patterns for specifying all the routes existing from the start to the end of the load module, (4) the route paths which are passed when a route is tested, and the like.

The reference numeral 15 denotes a load module testing equipment, which includes a route pattern information creator 15a, a route pattern testing state reflector 15b, a route pattern information data base 15c, a route pattern decision portion 15d for determining the route pattern to be tested next, a minimum route pattern information creator 16a, a minimum route pattern testing state reflector 16b, and a minimum route pattern execution information reflector 17a.

Figure 22:
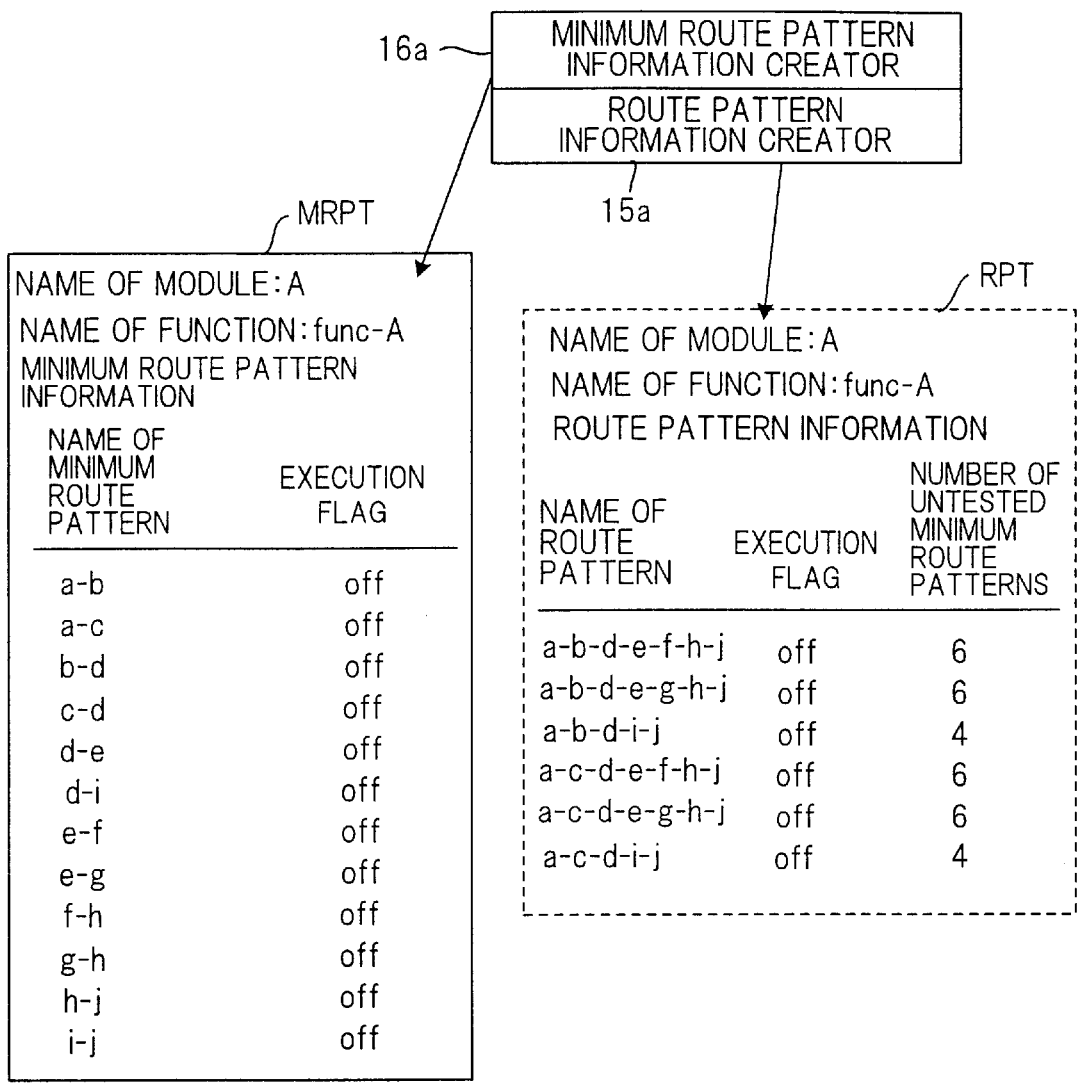
FIG. 22 is an explanatory view of route pattern information and minimum route pattern information.

The route pattern information creator 15a creates route pattern information RPT shown in FIG. 22 by using the information stored in the test execution trace information storage 14 and stores it in the route pattern information data base 15c. The route pattern information RPT is information showing the names of the route patterns existing in the load module, an execution flag showing whether or not each of the route patterns has been tested, and the number of minimum route patterns contained in each of the route pattern. The load modules in FIG. 20 includes six route patterns: abdefhj, abdeghj, abdij, acdefhj, acdeghj and acdij, which are listed in the route pattern column in FIG. 22.

At the initial stage since no route pattern has been tested, the execution flags in all the route patterns are OFF.

The minimum route pattern information creator 16a creates minimum route pattern information MRPT shown in FIG. 22 by using the information stored in the test execution trace information storage 14, and stores it in the 15c. The minimum route pattern information MRPT is information showing the correspondence of the name of a minimum route pattern to an execution flag, and the initial value of the execution flag is OFF. As described above, in the case shown in FIGS. 20A and 20B, the minimum route patterns are: a-b, a-c, b-d, c-d, d-e, d-i, e-f, e-g, f-h, g-h, h-j and i-j.

Figure 23:
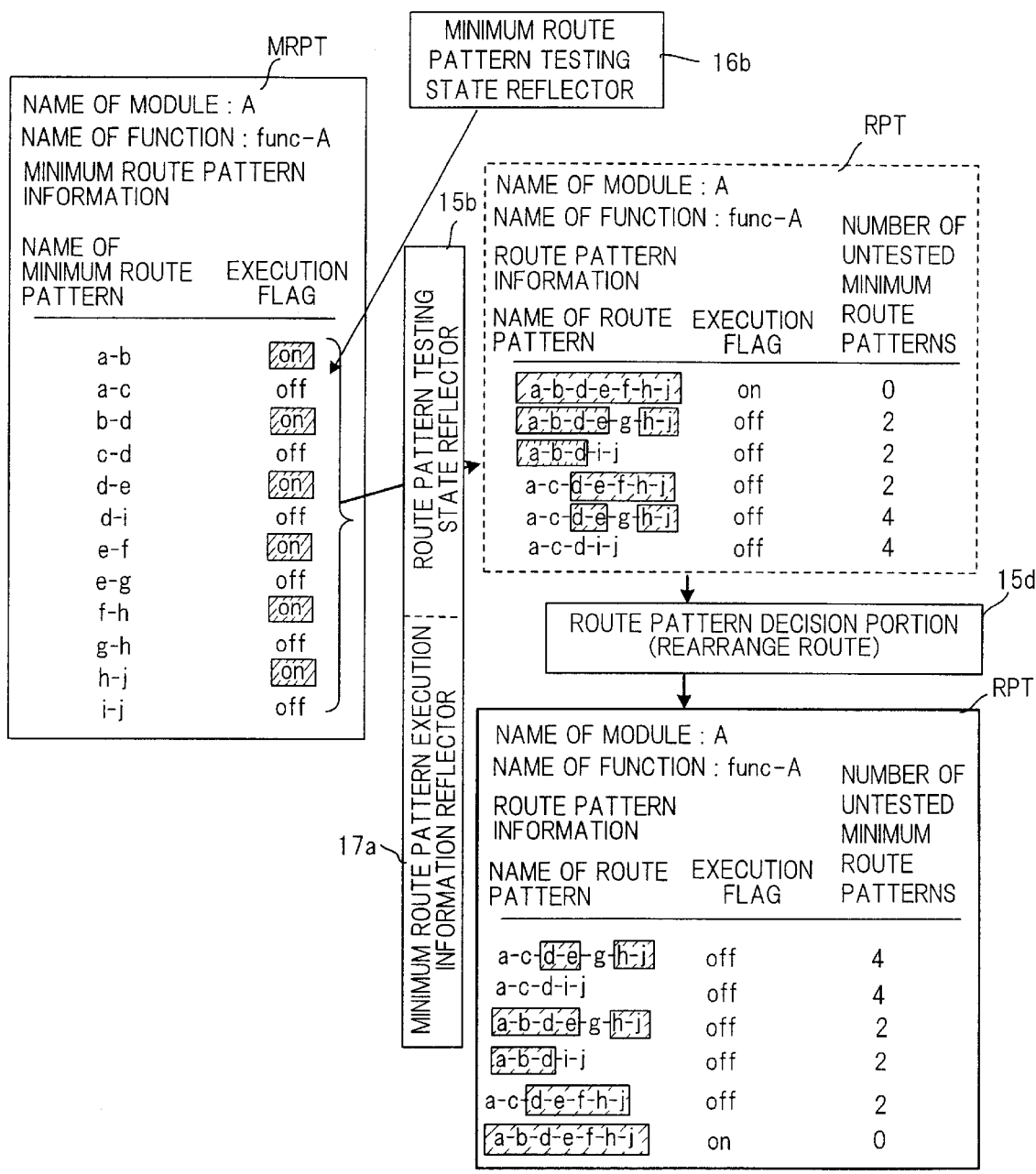
FIG. 23 is an explanatory view of route pattern information and minimum route pattern information after a testing.

The minimum route pattern testing state reflector 16b reflects the test execution state to the minimum route pattern information MRPT after a predetermined route pattern is tested. For example, when a route pattern abdefhj (see the dot line in FIG. 20B) is tested, the minimum route pattern testing state reflector 16b turns ON the execution flags of the minimum route patterns a-b, b-d, d-e, e-f, f-h and h-j, as shown in FIG. 23.

The route pattern testing state reflector 15b reflects the route pattern testing state to the route pattern information RPT after a predetermined route pattern is tested. More specifically, the route pattern testing state reflector 15b turns ON the execution flag of the tested route pattern in the route pattern information RPT, as shown in FIG. 23, by reference to the route patterns stored in the test execution trace information storage 14. The minimum route pattern execution information reflector 17a calculates the number of untested minimum route patterns contained in each route pattern, and updates the numbers of untested minimum route patterns in the route pattern information RPT, as shown in FIG. 23.

The route pattern decision portion 15d arranges the route patterns in the route pattern information RPT by priority of the number of untested minimum route patterns (see FIG. 23), and determines the route pattern containing the largest number of untested minimum route patterns to be the route pattern to be tested next. For example, at the initial stage shown in FIG. 22, one of the route patterns:

abdefhj, abdeghi, acdefhj and acdeghj is determined to be the route pattern to be tested next. In the case shown in FIG. 23, either of the route patterns acdeghj and acdij is determined to be the route pattern to be tested next.

Figure 24:
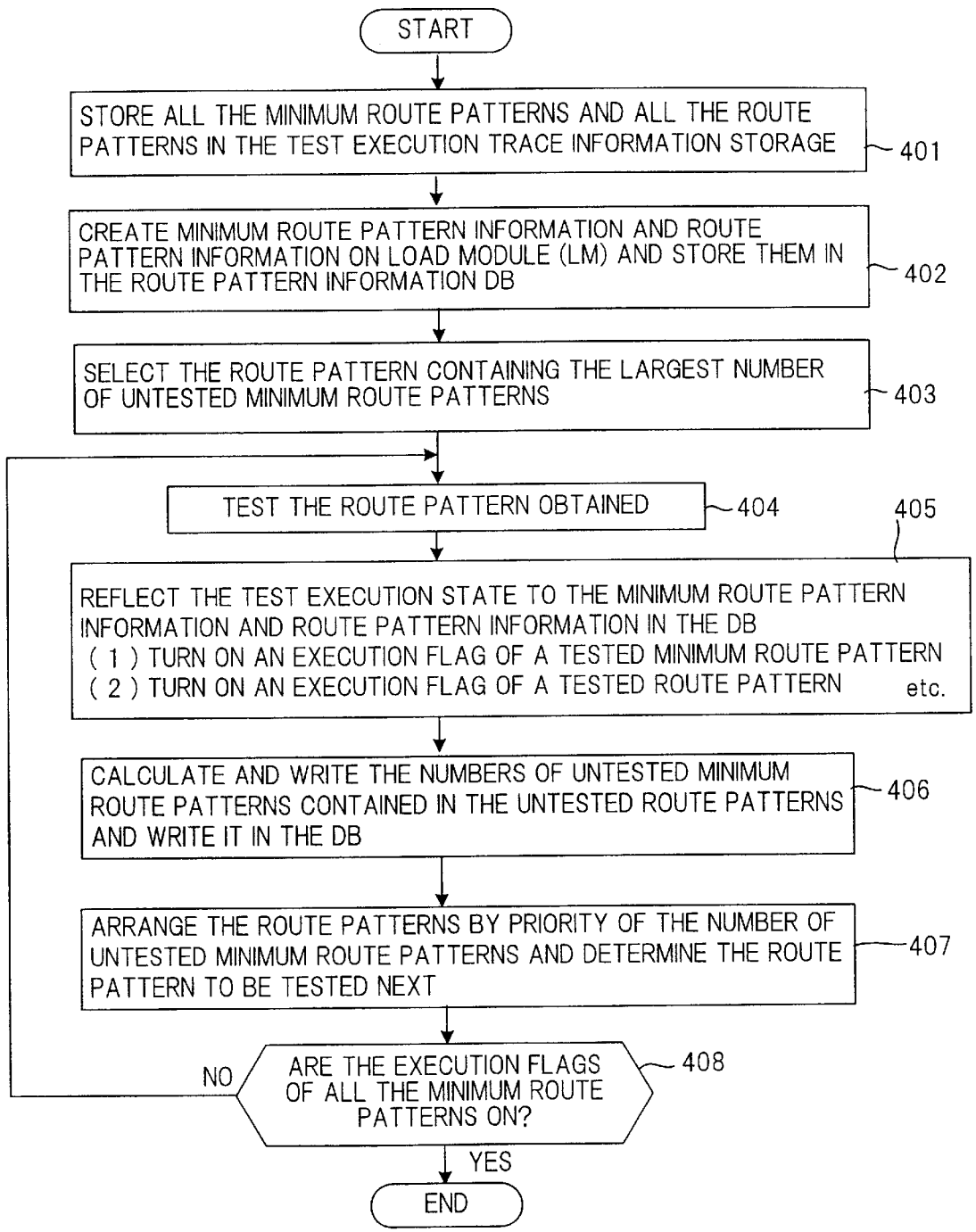
FIG. 24 is a flow chart of a process of determining and testing the route pattern to be tested in the fourth embodiment.

FIG. 24 is a flow chart of a process of determining and testing the route pattern to be tested in the fourth embodiment.

All the route paths that are produced when the source modules are compiled, all the minimum route patterns and all the route patterns are stored in the test execution trace information storage 14 (step 401).

The route pattern information creator 15a and the minimum route pattern information creator 16a then create the route pattern information RPT and the minimum route pattern information MRPT, respectively, shown in FIG. 22 by using the data stored in the test execution trace information storage 14 and stores them in the route pattern information data base 15c (step 402).

Thereafter, the route pattern decision portion 15d arranges the route patterns in the route pattern information RPT by priority of the number of untested minimum route patterns, and determines the route pattern containing the largest number of untested minimum route patterns to be the route pattern to be tested next (step 403).

Each branch condition is set so that the load module may be executed along the determined pattern, and the load module is started. The load module is executed along the determined route pattern, and the tested route paths are stored in the test execution trace information storage 14 (step 404).

The minimum route pattern testing state reflector 16b reflects the route pattern testing state to the minimum route pattern information after a route pattern is tested. More specifically, the minimum route pattern testing state reflector 16b turns ON the execution flag of the tested minimum route pattern. The route pattern testing state reflector 15b turns ON the execution flag of the tested route pattern by reference to the information stored in the test execution trace information storage 14 (step 405). The minimum route pattern execution information reflector 17a calculates the number of untested minimum route patterns contained in each untested route pattern, and updates the number of untested minimum route patterns (step 406).

When the numbers of untested minimum route patterns are updated, the route pattern decision portion 15d arranges the untested route patterns in the route pattern information RPT by priority of the number of untested minimum route patterns, and determines the route pattern containing the largest number of untested minimum route patterns to be the route pattern to be tested next (step 407).

A test execution portion 15d then judges whether or not the execution flags of all the minimum route pattern are ON by reference to the minimum route pattern information MRPT (step 408), and if the answer is in the negative, the processing from the step 404 are repeated. If the answer is in the affirmative, the testing of the load module is finished.

According to the fourth embodiment, since two sequentially adjacent route paths are united as a minimum route pattern, and the route pattern to be tested next is determined so that all the minimum route patterns may be efficiently tested, it is possible to shorten the testing time and heighten the test quality.

(E) Fifth Embodiment

Figure 25A:
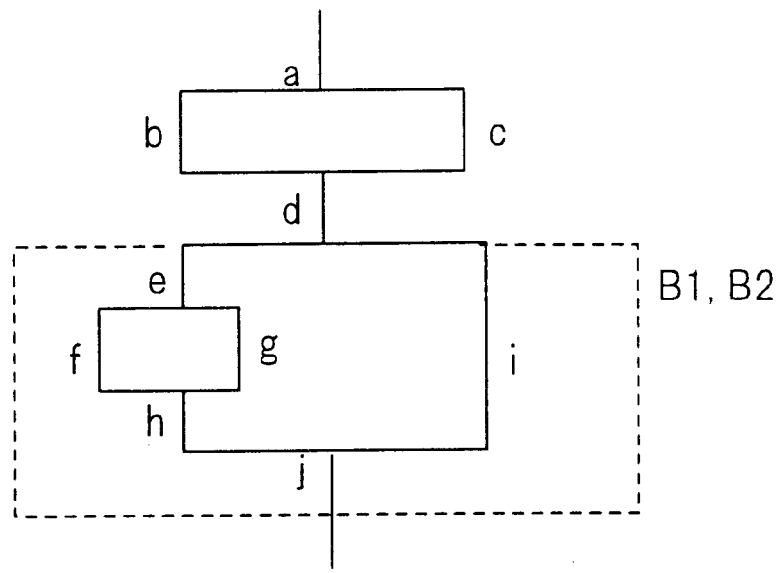
FIGS. 25A and 25B are explanatory views of a fifth embodiment of the present information.

When a load module is modified, a strict test is not necessary in the route paths which are not influenced by the modification (the route paths in an unmodified part), and it is enough to confirm that the modified part and the unmodified part are combined without any problem. For example, it is now assumed that only route paths a, b, c and d are modified in the tested source module having branches shown in FIG. 25A. Since the route paths e, f, g, h, i and j have already been adequately tested, the possibility of the modification of the route paths a to d influencing the route paths e to j is very low. In such a case, the group of route paths e to j is logically collected in the form of a block (see the dot lines), and entry conditions are set. In FIG. 25A, two entry conditions are set, and a route block B1 is formed under a first entry condition, and a route block B2 is formed under the second entry condition.

Figure 25B:
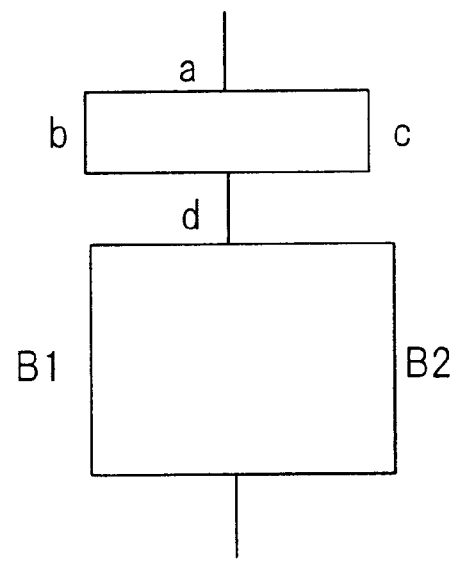

An entry condition is set with a branch condition contained in the unmodified part taken into consideration. For example, in the load module shown in FIG. 25A, if it is assumed that the branch condition to the route path i is $1 \leq num < 10$, the branch condition to the route path e is $num < 1, 10 \leq num$, the branch condition to the route path f is $num < 1$, and the branch condition to the route path g is $10 \leq num$, the first and second entry conditions are (1) $num < 1, 10 \leq num$ and (2) $1 \leq num < 10$, respectively. If these route blocks B1 and B2 are applied to FIG. 25A, a new branched logic tree consisting of the route paths a to d and the route blocks B1 and B2 are obtained, as shown in FIG. 25B. If the first embodiment is applied with the route blocks B1 and B2 in FIG. 25B regarded as route paths, it is possible to strictly test only the modified route paths, and also test the combination of the modified part and the unmodified part.

Figure 27:
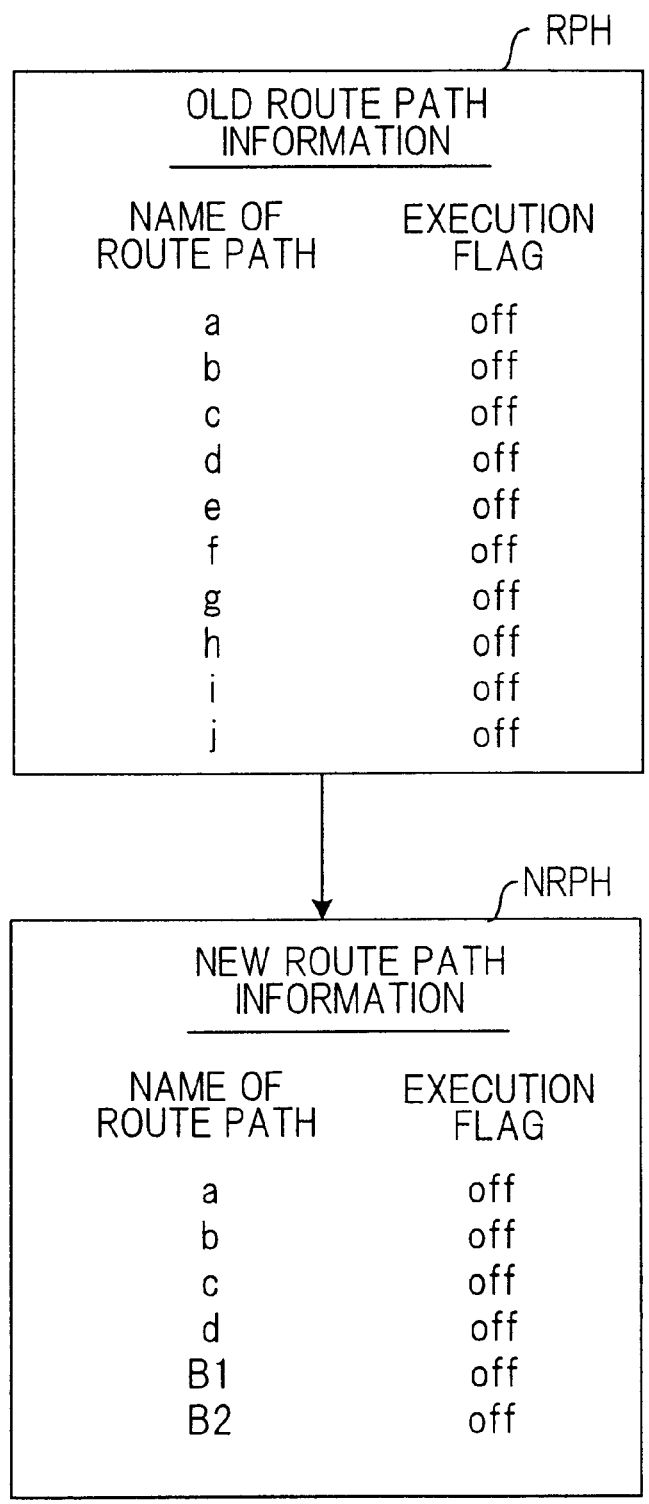
FIG. 27 is an explanatory view of new and old route path information.

FIGS. 26A to 26C are explanatory views of new and old route pattern information and route block information, and FIG. 27 is an explanatory view of new and old route path information.

Both of old route pattern information RPT and old route path information RPH have the same structures as those of the route pattern information RPT and route path information RPH in the first embodiment. That is, the old route pattern information RPT shows (1) the name of a route pattern, (2) the execution flag, and (3) the number of untested route paths for each pattern, as shown in FIG. 26A. The old route path information RPH shows (1) the name of a route path and (2) the execution flag for each route path, as shown in FIG. 27.

Route block information RBL shows (1) the name of a route block, (2) the route paths contained in the route block, and (3) the entry condition to the route block for each of the route blocks B1, B2 obtained (see FIG. 25B), as shown in FIG. 26B.

New route pattern information NRPT shows (1) the name of a route pattern, (2) the execution flag and (3) the number of untested route paths for each route pattern contained in the load module shown in FIG. 25B, as shown in FIG. 26C. New route path information NRPH shows (1) the name of a route path and (2) the execution flag for each route path contained in the load module shown in FIG. 25B, as shown in FIG. 27.

The old route pattern information RPT contains six route patterns, while the new route pattern information NRPT contains only four. Thus, the number of route patterns is reduced, so that the number of untested route paths is also reduced. It is therefore possible to efficiently extract route patterns so that the route paths to be tested may be preponderantly tested.

Figure 28:
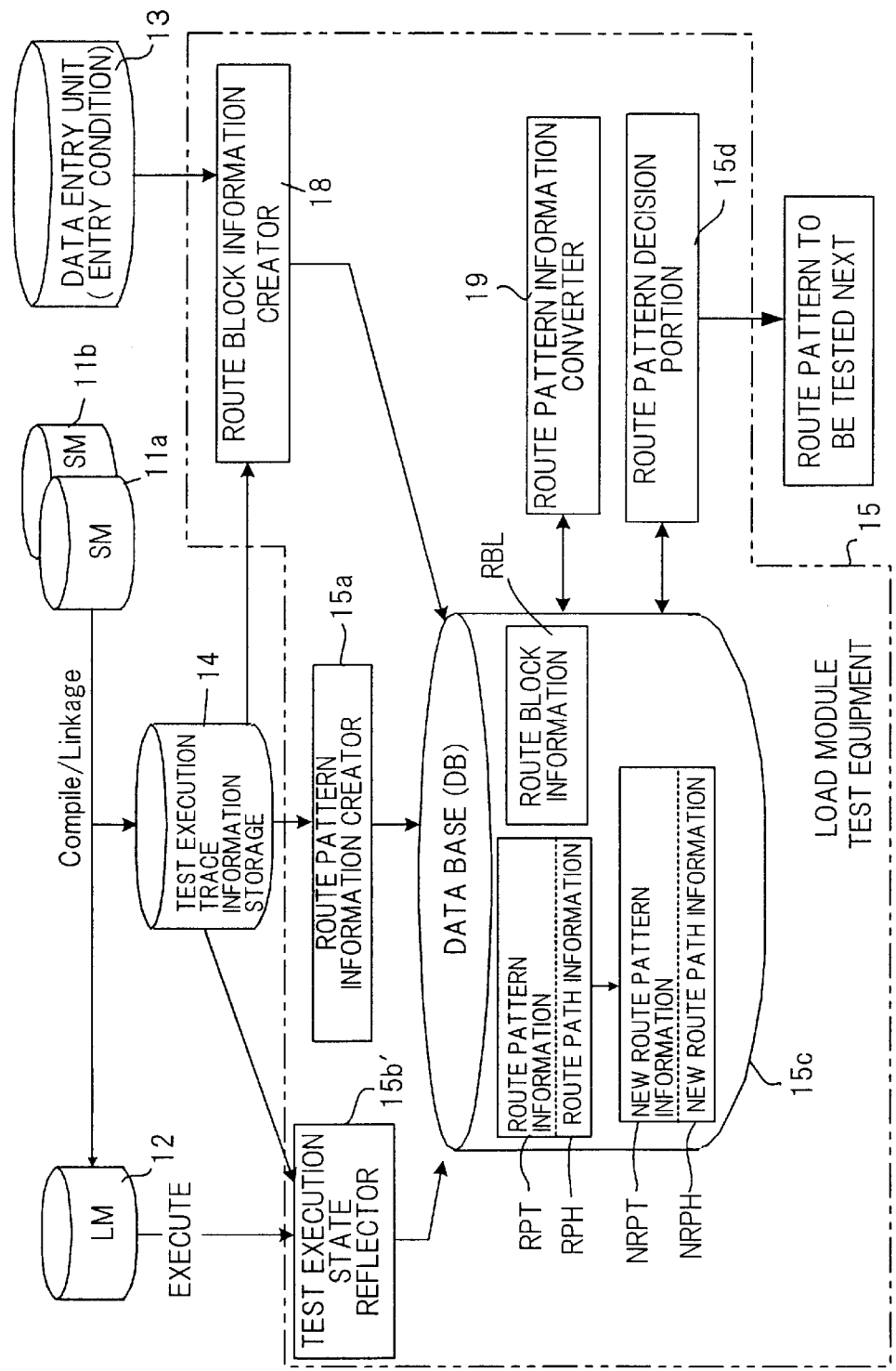
FIG. 28 shows the structure of the fifth embodiment of a load module testing system according to the present invention.

FIG. 28 shows the structure of the fifth embodiment of a load module testing system according to the present invention. In FIG. 28, the reference numerals 11a and 11b represent source modules, 12 a load module created by using a compiler and a linkage editor, 13 a data entry unit for inputting an entry condition, and 14 a test execution trace information storage for storing (1) all the route paths that are produced when the source modules are compiled, (2) all the route patterns existing from the start to the end of the load module, (3) the route paths and the route blocks which are passed when a route is tested, and the like. The reference numeral 15 denotes a load module testing equipment, which includes a route pattern information creator 15a, a test execution state reflector 15b', a data base 15c, a route pattern decision portion 15d for determining the route pattern to be tested next, a route block information creator 18 and a route pattern information converter 19.

The route pattern information creator 15a creates the old route path information RPH and the old route pattern information RPT shown in FIGS. 27 and 26A by using the information stored in the test execution trace information storage 14 and stores them in the data base 15c.

The route block information creator 18 creates the route block information RBL shown in FIG. 26B by using the information stored in the test execution trace information storage 14 and the set entry condition and stores it in the data base 15c.

The route pattern information converter 19 converts the old route path information RPH and the old route pattern information RPT into the new route path information NRPH and the new route pattern information NRPT, respectively, shown in FIGS. 27 and 26C, respectively.

The test execution state reflector 15b' reflects the route pattern testing state to the new route pattern information NRPT and the new route path information NRPH by reference to the information (the names of the tested route patterns, the names of the passed route paths and the names of the passed route blocks) which is stored in the test execution trace information storage 14, after a predetermined route pattern has been tested. For example, when the route pattern abdB1 is tested, the new route path information NRPH and the new route pattern information NRPT become as shown in FIGS. 29A and 29B, respectively.

The route pattern decision portion 15d arranges the route patterns in the new route pattern information NRPT by priority of the number of untested route paths, and determines the route pattern containing the largest number of untested route paths to be the route pattern to be tested next. For example, in the case shown in FIG. 29B, the route pattern acdB2 is determined to be the route pattern to be tested next.

Figure 30:
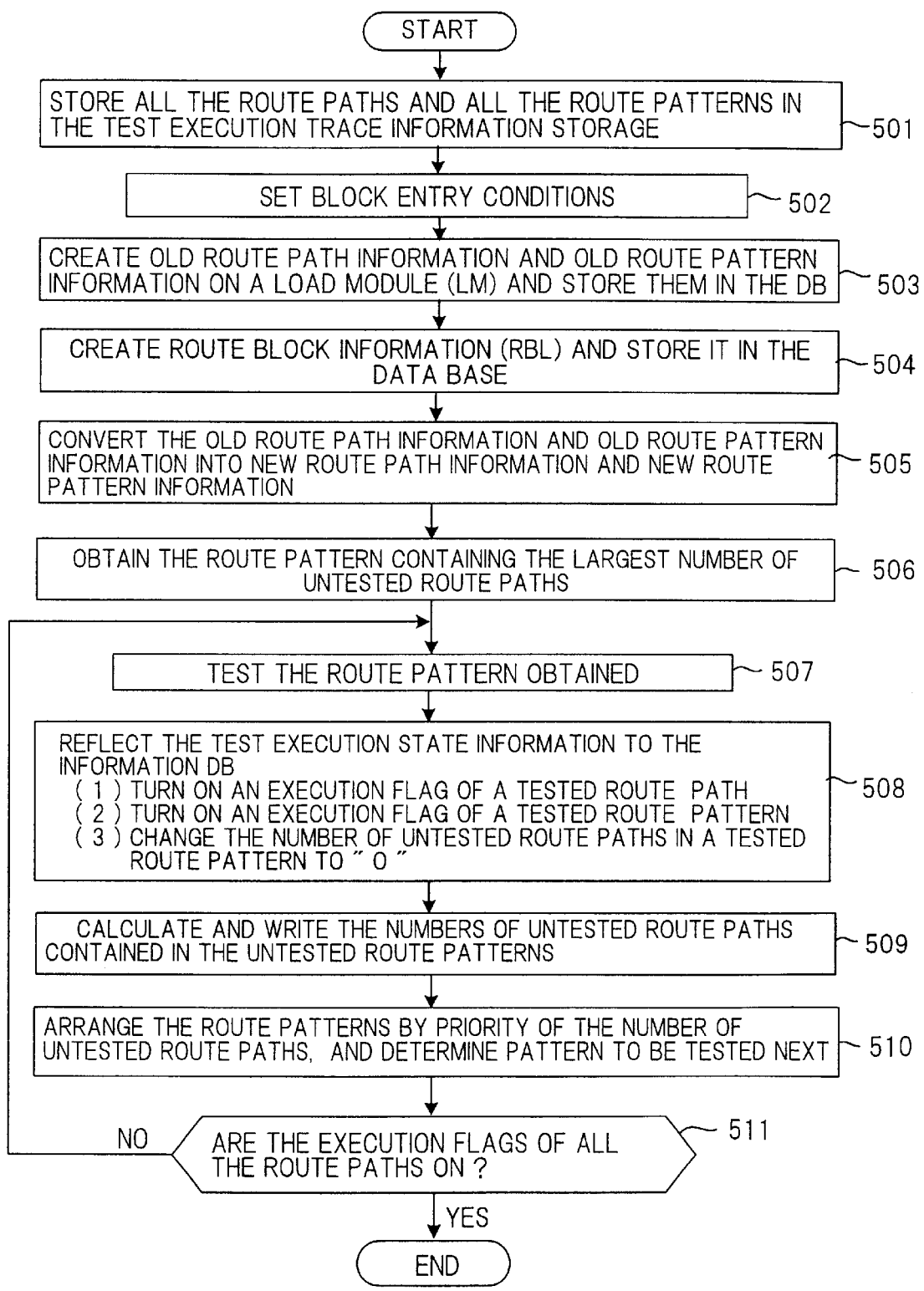
FIG. 30 is a flow chart of a process of determining and testing the pattern to be tested in the fifth embodiment.

FIG. 30 is a flow chart of a process of determining and testing the route pattern to be tested in the fifth embodiment.

All the route paths and all the route patterns that are produced when the source modules are compiled are stored in the test execution trace information storage 14 (step 501). The entry conditions to the blocks B1 and B2 are input (step 502).

The route pattern information creator 15a then creates the old route path information RPH and the old route pattern information RPT by using the information stored in the test execution trace information storage 14 and stores them in the route pattern information data base 15c (step 503). Thereafter, the route block information creator 18 creates the route block information RBL by using the information stored in the test execution trace information storage 14 and the set entry condition and stores it in the data base 15c (step 504).

The route pattern information converter 19 converts the old route path information RPH and the old route pattern information RPT into the new route path information NRPH (FIG. 27) and the new route pattern information NRPT (FIG. 26C), respectively, by using the route block information RBL (step 505).

The route pattern decision portion 15d arranges the route patterns in the new route pattern information NRPT by priority of the number of untested route paths, and determines the route pattern containing the largest number of untested route paths to be the route pattern to be tested next (step 506). Each branch condition is set so that the load module may be executed along the determined pattern, and the load module is started. The load module is executed along the determined route pattern, and the tested route paths are stored in the test execution trace information storage 14 (step 507).

The test execution state reflector 15b' reflects the route pattern testing state to the data base 15c by reference to the names of the tested route patterns and the names of the tested route paths (including the tested route blocks) which are stored in the test execution trace information storage 14. More specifically, the test execution state reflector 15b' (1) records the tested route pattern as tested (turns ON the execution flag), (2) records each route path constituting the tested route pattern as tested (turns ON the execution flag), and (3) records the number of untested route paths of the tested route pattern as 0 (step 508). The test execution state reflector 15b' then calculates the number of untested route paths contained in each of the untested route patterns (the number of untested route paths and untested route blocks) and updates the numbers of untested route paths in the new route pattern information NRPT (step 509).

When the numbers of untested route paths are updated, the route pattern decision portion 15d arranges the route patterns in the new route pattern information NRPT by priority of the number of untested route paths, and determines the route pattern containing the largest number of untested route paths to be the route pattern to be tested next (step 510).

A test execution portion then judges whether or not the execution flags of all the route paths (containing the route blocks) are ON by reference to the new route path information NRPH (step 511), and if the answer is in the negative, the processing from the step 507 is repeated. If the answer is in the affirmative, the testing of the load module is finished.

According to the fifth embodiment, when a tested load module is modified, it is possible to strictly test only the modified route paths and, besides, it is possible to test the combination of the modified part and the unmodified part.

(F) Sixth Embodiment

If the route pattern to be tested next is selected so that all the route paths may be tested, some route paths are tested a plurality of times, and the number of times of testing inconveniently differs widely with route paths. If a route pattern is selected so that each route path is tested equally, it is possible to raise the branch coverage ratio and execute a higher-quality test.

Therefore, in a sixth embodiment, (1) the number of times each branch route path has been selected at each branch point at the time of determining the tested routes is managed, (2) the branch route path which has been selected the smallest number of times at each branch point is determined to be the route to be tested next, and (3) routes to be tested are determined until there exists no unselected branch route path.

Figure 31:
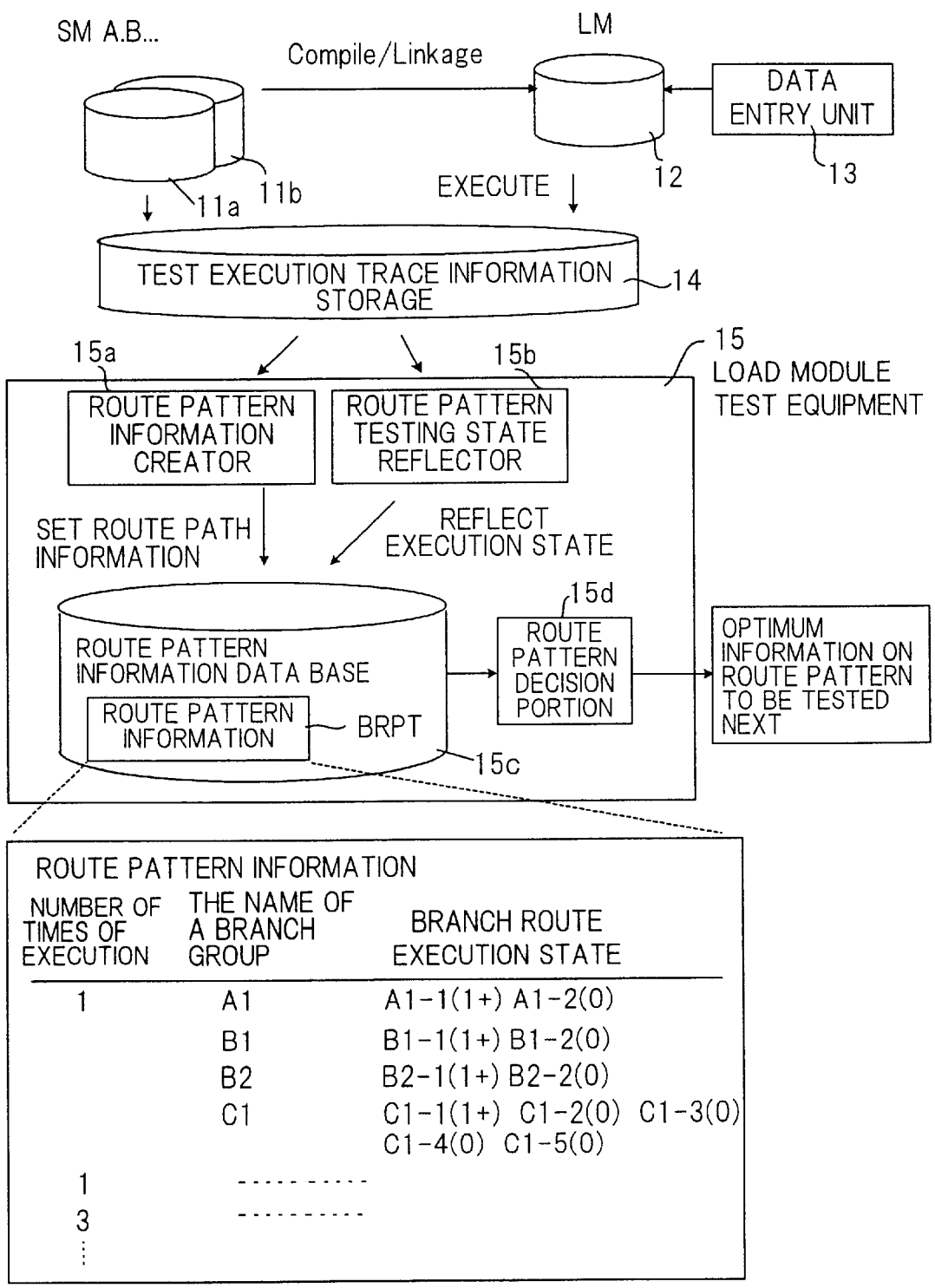
FIG. 31 shows the structure of a sixth embodiment of a load module testing system according to the present invention.

FIG. 31 shows the structure of a sixth embodiment of a load module testing system according to the present invention. In FIG. 31, the reference numerals 11a and 11b represent source modules, 12 a load module created by translating and link editing the source modules 11a, 11b by a compiler and a linkage editor, 13 a data entry unit for inputting test data and an entry condition, and 14 a test execution trace information storage for storing (1) all the route paths that are produced when the source modules are compiled, (2) the number of a branch point (the name of a branch group) and the branch paths at the branch point, (3) the route paths which are passed when a route is tested, and the like. The reference numeral 15 denotes a load module testing equipment, which includes a route pattern information creator 15a, a route pattern testing state reflector 15b, a route pattern information data base 15c, a route pattern decision portion 15d for determining the route pattern to be tested next, etc.

The route pattern information creator 15a creates route pattern information BRPT by using the information stored in the test execution trace information storage 14 and stores it in the data base 15c. The route pattern information BRPT contains (1) the number of times of testing, (2) the name of a branch group, (3) the branch route testing state showing the number of times of testing of each branch route path, etc. The route pattern testing state reflector 15b creates the route pattern information BRPT which reflects the test execution state, and adds "1" to the number of times each branch route path constituting the tested route has been tested. The route pattern decision portion 15d selects the branch route path which has been selected the smallest number of times at each branch point as the route to be tested next.

FIG. 32 is an explanatory view of the correspondence of a step, a branch processing group, content of processing, a route path, a branch route path, etc. in a source module in the C language. In correspondence to a branch instruction, a branch group (A1, B1, B2, C1) is shown, and the branch route paths constituting each branch group are shown. Steps 2 to 5 constitute a branch group A1, steps 7 to 17 a branch group B1, steps 9 to 12 a branch group B2 and steps 19 to 25 a branch group C1. The branch groups A1, B1 and C1 contain the branch route paths A1-1 and A1-2; B1-1 and B1-2; and C1-1, C1-2, C1-3, C1-4 and C1-5; respectively, and the branch route path B1-1 further contains branch route paths B2-1 and B2-2.

Figure 33:
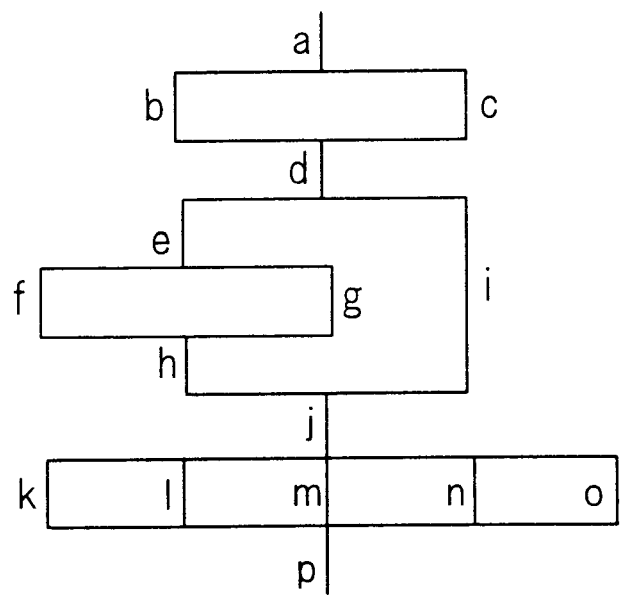
FIG. 33 is a flow chart of a load module testing process using route paths.

The process for testing this source program by using route paths are shown in FIG. 33. Route paths a, d, j and p are route paths which are inevitably passed at the test of any route pattern, and when the route path e branched from the route path d is tested, the route path h is inevitably passed and tested whichever of the route paths f and g is tested.

Figure 34:
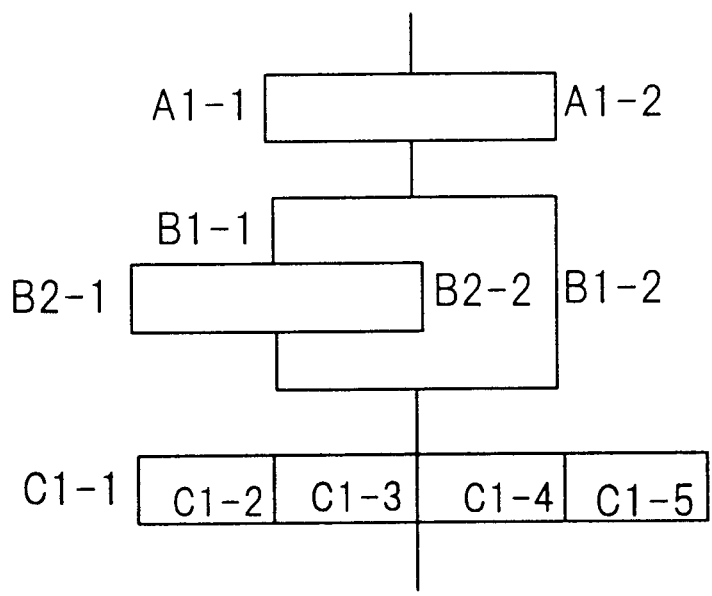
FIG. 34 is a flow chart of a load module testing process using branch route paths.
Figure 37A:
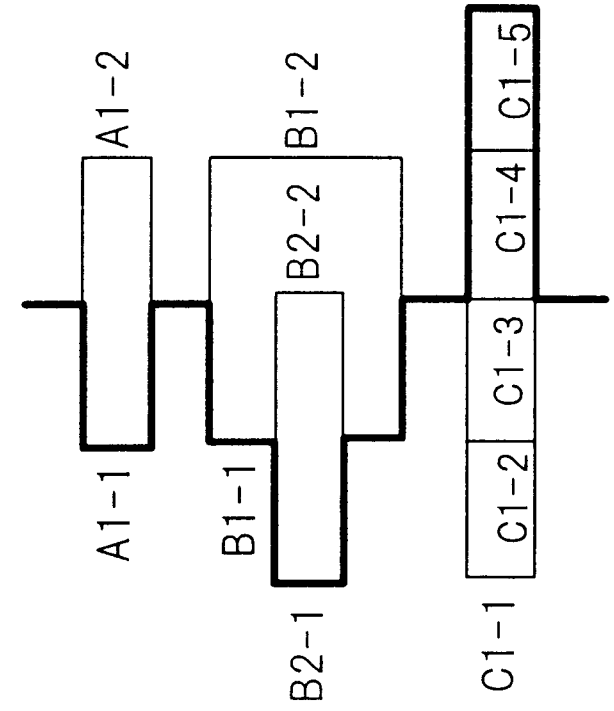
FIGS. 37A and 37B are separate explanatory views of tested route patterns in the sixth embodiment.
Figure 37B:
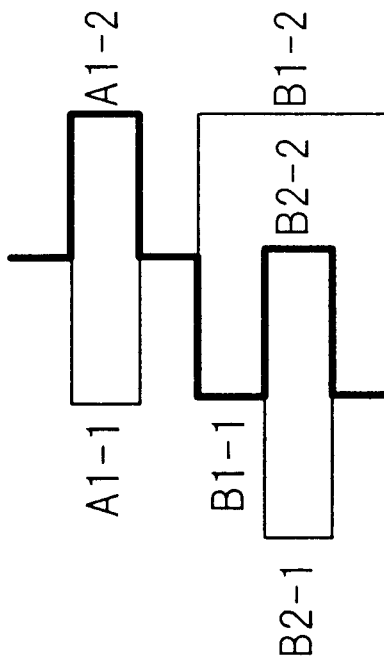
Figure 38:
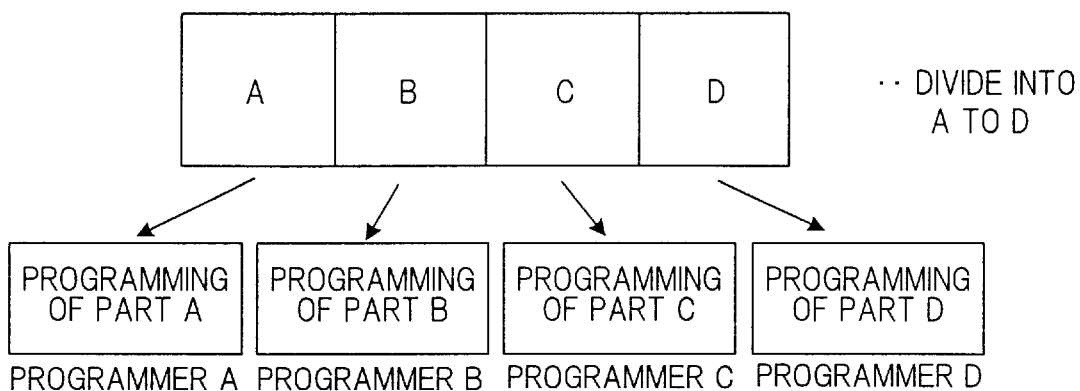
FIG. 38 is an explanatory view of a programming method adopting a modular system.
Figure 39:
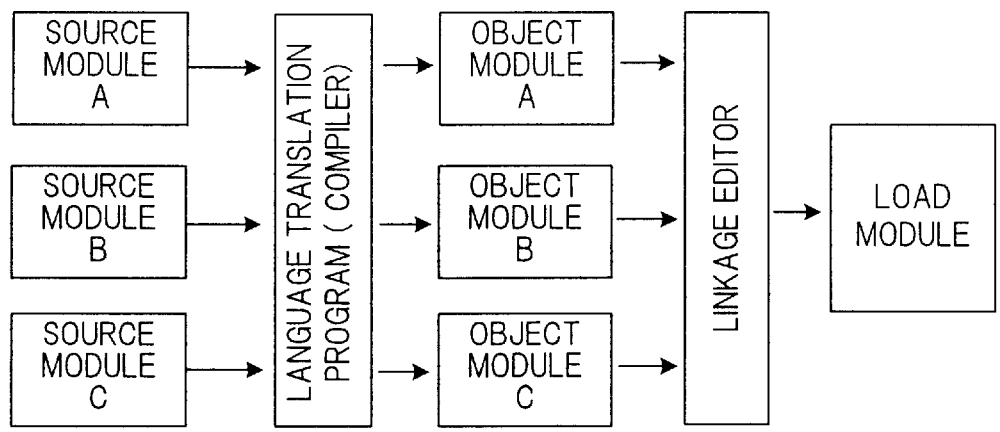
FIG. 39 is an explanatory view of a process of creating a load module.

Actually, a route pattern is set by combining route paths, but in order to cover all the branches, it is easier to select a route pattern by using branch route paths than using route paths. For this reason, in the sixth embodiment, a route pattern is selected on the basis of branch route paths. FIG. 34 is a flow chart of a load module using branch route paths in place of the route paths shown in FIG. 33.

When a load module (LM) is tested, the route pattern testing state reflector 15b counts the number of times each branch route path in each branch group has been tested, and reflects it to the route pattern information BRPT. In the route pattern information BRPT, the information showing the name of the branch group and the number of times each branch route path has been passed (the number of times of testing) has the following format:

the name of a branch group: (the number of times the first branch route path has been tested) (the number of times the second branch route path has been tested) . . . (the number of times the n-th branch route path has been tested).

The mark "+" is added to the end of the number of times of testing the branch route path which has been tested the previous time. If the above format is applied to the branch groups A1 to C1 shown in FIG. 32, the route pattern information BRPT manages the number of times each branch route path in each branch group has been tested in the following format:

branch group A1: (the number of times A1-1 has been tested) (the number of times A1-2 has been tested)

branch group B1: (the number of times B1-1 has been tested) (the number of times B1-2 has been tested)

branch group B2: (the number of times B2-1 has been tested) (the number of times B2-2 has been tested)

branch group C1: (the number of times C1-1 has been tested) (the number of times C1-2 has been tested) (the number of times C1-3 has been tested) (the number of times C1-4 has been tested) (the number of times C1-5 has been tested).

The route pattern decision portion 15d selects and determines the branch route path which has been tested the smallest number of times at each branch point to be the route to be tested next. To state this in more detail, the route pattern decision portion 15d selects a predetermined branch route path from each branch group according to the following rule, and determines it to be the route to be tested next.

(1) In each branch group, the branch route path which has been tested at the smallest number of times is selected. If there are a plurality of branch route paths which have been tested at the smallest number of times in the branch group concerned, the process proceeds to the next step.

(2) Judgment is made as to whether or not there is another branch group immediately before the branch group concerned. If the answer is in the affirmative, judgement is made as to whether or not the branch route path to be tested next in the preceding branch group is the same as the branch route path selected at the previous time (except the initial stage). If the answer is in the negative, the same branch route path as the one selected at the previous time is selected in the branch group concerned.

On the other hand, if there is not another branch group immediately before the branch group concerned, or if the branch route path to be tested next in the preceding branch group is the same as the branch route path selected at the previous time (including the initial stage), the process proceeds to the next step.

(3) The branch route path having the smallest number is selected from the branch route paths which do not have the mark "+" added to the ends thereof.

The route to be tested next is determined in the above process, the determined route is tested, and if all the branch route paths have been tested, the testing of the load module is finished.

FIG. 35 shows the result of the process of determining a branch route path in accordance with the above rule. In FIG. 35, in the column 51, the order of the test in accordance with a predetermined testing pattern is written. In the column 52 of branch route testing state, the number of times each branch root path in each branch group has been tested is written, and in the branch group A1, the numbers of times (figures in the parentheses) the branch route paths A1-1 and A1-2 have been tested are shown. A branch route path with the mark "+" added to the end denotes one which has been selected and tested at the previous time. In the branch route path column 53, the branch route path to be selected at each branch point at the next test is written. That is, the next route pattern is specified.

FIGS. 36A to 36C and FIGS. 37A to 37C are explanatory views of tested route patterns. In these drawings, the route patterns of the i-th test (i=1, 2, . . . 5) in FIG. 35 are written with thick lines. As shown in FIG. 35, if a branch route path is determined and tested, all the branch route paths A1-1, A1-2, B1-1. B1-2, B2-1, C1-1, C1-2 and C1-3 are covered by the third test. Therefore, when the rest branch route paths B2-2, C1-4 and C1-5 are tested, these tested route paths are to be tested again. In such a case, in the sixth embodiment, the combination of the branch route paths can be varied, so that the branch coverage ratio is raised and a higher-quality test is enabled.

As explained above, according to the present invention, (1) when an untested route pattern is tested, the current state of the testing of all the route patterns is managed with the untested route pattern concerned changed to a tested route pattern, the current state of the testing of all the route paths is managed with the route paths constituting the untested route pattern changed to tested route paths, and the number of untested route paths for each untested route pattern is managed, (2) then, an untested route pattern which is constituted by the largest number of untested route paths is determined to be the route pattern to be tested next, and (3) route patterns to be tested are successively determined and tests are executed until there exists no untested route path. In this manner, since route patterns are tested by priority of the number of untested route paths constituting them, it is possible to efficiently test all the route paths.

According to the present invention, when there are a plurality of untested route patterns which contain the largest number of untested route paths, the untested route pattern in which the number of steps of execution is the smallest is determined to be the route pattern to be tested next. In this manner, it is possible to efficiently test all the route paths.

According to the present invention, with respect to a route pattern containing a route path which calls and executes a subroutine, the number of untested route paths except the route path containing the subroutine and the number of untested route paths in the subroutine are managed, respectively, and the numbers of these untested route paths are added up as the total number of untested route paths in the route pattern. A route pattern which is constituted by the largest number of untested route paths is determined to be the route pattern to be tested next. In this manner, it is possible to effectively test a load module including a process for calling and executing a subroutine.

According to the present invention, (1) when a load module is modified, the route paths which are not influenced by the modification are collected in the form of a block and a route block is defined by combining various entry conditions to the block, (2) a route pattern is specified by using route paths and route blocks, (3) a route pattern which is constituted by the largest number of untested route paths and untested route blocks is determined to be the route pattern to be tested next, and (4) route patterns to be tested are successively determined and tests are executed until there exists no untested route path or untested block. In this manner, when a part of a load module is modified, it is possible to efficiently test the modified part in a short time with the combination of the modified part and the unmodified part taken into consideration.

In the present invention, (1) two consecutive route paths are defined as a minimum route pattern, (2) when an untested route pattern is tested, the current state of the testing of all the route patterns is managed with the untested route pattern changed to a tested route pattern, the current state of the testing of all the minimum route patterns is managed with the minimum route patterns defined by the route paths which specify the untested route pattern changed to tested minimum route patterns, and the number of untested minimum route patterns for each untested route pattern is managed, (3) an untested route pattern which is constituted by the largest number of untested minimum route patterns is determined to be the route pattern to be tested next, and (4) route patterns to be tested are successively determined and tests are executed until there exists no untested minimum route pattern. In this manner, since it is possible to make a pair of consecutive route patterns and manage the state of the testing of the pairs of route patterns, it is possible to execute a high-quality test.

According to the present invention, (1) in order to specify the route to be tested, the number of times each branch route path in each branch-point has been selected is managed, (2) the route to be tested next is determined by selecting the branch route path which has been selected the smallest number of times in each branch-point, and (3) the branch route paths to be tested are determined and tested until there exists no untested branch route path. In this manner, it is possible to automatically select a route path so that each route path is tested equally to the utmost which results in increase of the branch coverage ratio and a higher-quality test.

As many apparently widely different embodiments of the present invention can be made without departing from the spirit and scope thereof, it is to be understood that the invention is not limited to the specific embodiments thereof except as defined in the appended claims.

What is claimed is:

1. A method of determining a route to be tested in the testing of a load module which includes a multiplicity of routes (referred to as route patterns) from start to end of a program, each route, pattern being composed of a multiplicity of route paths, said method comprising the steps of:

testing an untested route pattern and managing (1) current state of the testing of all of said route patterns with said untested route pattern changed to a tested route pattern, (2) current state of the testing of all of route paths with the route paths constituting said untested route pattern changed to tested route paths, and (3) number of untested route paths for each untested route pattern;

determining an untested route pattern which is constituted by largest number of untested route paths to be the route pattern to be tested next, and testing the thus-determined route pattern; and determining and testing route patterns to be tested successively until there exists no untested route path.

2. A method of determining a route to be tested in the testing of a load module according to claim 1, further comprising the steps of:

obtaining number of steps of execution in each of said route paths;

calculating total number of steps in a route pattern from the number of steps of all the route paths which constitute said route pattern; and determining the untested route pattern in which the total number of steps of execution is the smallest to be the route pattern to be tested next, when there are a plurality of untested route patterns which have the largest number of untested route paths.

3. A method of determining a route to be tested in the testing of a load module according to claim 1, further comprising the steps of:

managing the number of untested route paths in an untested route pattern except a route path which calls and executes a subroutine, and the number of untested route paths in said subroutine, respectively; and adding up said numbers of untested route paths as the total number of untested route paths in said untested route pattern; and determining the untested route pattern which is constituted by largest number of untested route paths to be the route pattern to be tested next.

4. A method of determining a route to be tested in the testing of a load module according to claim 1, further comprising the steps of:

collecting the route paths which are not influenced by modification in form of a block, and defining a route block with various entry conditions into said block, when said load module is modified;

composing route patterns by using route paths and route blocks;

determining the route pattern which is constituted by largest number of untested route paths and untested route blocks to be the route pattern to be tested next; and successively determining and testing route patterns to be tested until there exists no untested route path and untested block.

5. A method of determining a route to be tested in the testing of a load module which includes a multiplicity of routes (referred to as route patterns) from start to the end of program, each route pattern being composed of a multiplicity of route paths, said method comprising the steps of:

defining two consecutive route paths as a minimum route pattern;

testing an untested route pattern and managing (1) current state of the testing of all of said route patterns with said untested route pattern changed to a tested route pattern, (2) current state of the testing of all of the minimum route patterns with the minimum route patterns defined by route paths which specify said untested route pattern changed to tested minimum route patterns, and (3) number of untested minimum route patterns for each untested route patterns;

determining an untested route pattern constituted by largest number of untested minimum route patterns to be the route pattern to be tested next; and successively determining and testing route patterns to be tested until there exists no untested minimum route pattern.

6. A method of determining a route to be tested in the testing of a load module which includes a multiplicity of branch-points and routes from the start to end of a program, and specifying a route by selecting one of branch paths at each branch-point, said method comprising the steps of:

managing number of times each branch route path in each of said branch points has been selected;

determining the route to be tested next by selecting a branch route path which has smallest number of times in each branch point; and successively determining and testing routes to be tested until there exists no untested branch route path.

* * * * *